(12) United States Patent  
McAllister

(10) Patent No.: US 7,830,258 B2  
(45) Date of Patent: Nov. 9, 2010

(54) SYSTEMS, METHODS, AND DEVICES FOR CONVERTING AND COMMISSIONING WIRELESS SENSORS

(75) Inventor: Clarke W. McAllister, Eugene, OR (US)

(73) Assignee: ADASA, Inc., Eugene, OR (US)

( * ) Notice: Subject to any disclaimer, the term of this patent is extended or adjusted under 35 U.S.C. 154(b) by 589 days.

(21) Appl. No.: 11/465,712

(22) Filed: Aug. 18, 2006

(65) Prior Publication Data

US 2007/0040684 A1     Feb. 22, 2007

Related U.S. Application Data

(60) Provisional application No. 60/709,713, filed on Aug. 19, 2005.

(51) Int. Cl.
*G08B 13/14* (2006.01)

(52) U.S. Cl. .............. 340/572.1; 340/10.51; 340/572.8; 340/693.5

(58) Field of Classification Search .............. 340/572.1, 340/572.8, 10.1, 10.51, 693.5, 693.9
See application file for complete search history.

(56) References Cited

U.S. PATENT DOCUMENTS

| | | | |
|---|---|---|---|
| 5,227,617 A | 7/1993 | Christopher et al. | |
| 6,130,613 A * | 10/2000 | Eberhardt et al. | 340/572.8 |
| 6,246,326 B1 | 6/2001 | Wiklof et al. | |
| 6,279,638 B1 | 8/2001 | Goodwin et al. | |
| 6,280,544 B1 | 8/2001 | Fox et al. | |
| 6,379,058 B1 | 4/2002 | Petteruti et al. | |
| 6,409,401 B1 | 6/2002 | Petteruti et al. | |
| 6,478,229 B1 | 11/2002 | Epstein | |
| 6,481,907 B2 | 11/2002 | Banach et al. | |
| 6,532,346 B2 | 3/2003 | Gallivan | |
| 6,677,852 B1 * | 1/2004 | Landt | 340/10.1 |
| 6,805,183 B2 | 10/2004 | Goodwin et al. | |
| 6,848,616 B2 | 2/2005 | Tsirline et al. | |
| 6,857,714 B2 | 2/2005 | Hohberger et al. | |
| 6,884,312 B2 | 4/2005 | Mitchell et al. | |
| 6,899,476 B1 | 5/2005 | Barrus et al. | |
| 6,963,351 B2 | 11/2005 | Squires et al. | |
| 7,066,667 B2 | 6/2006 | Chapman et al. | |
| 7,069,251 B1 | 6/2006 | Bartz et al. | |
| 7,073,712 B2 | 7/2006 | Jusas et al. | |
| 7,075,435 B2 | 7/2006 | Jesser | |
| 2003/0227528 A1 | 12/2003 | Hohberger et al. | |
| 2005/0045724 A1 | 3/2005 | Tsirline et al. | |
| 2005/0280537 A1 * | 12/2005 | Feltz et al. | 340/572.1 |
| 2006/0117554 A1 * | 6/2006 | Herrmann et al. | 340/572.8 |

OTHER PUBLICATIONS

Morgan, Samuel P., "Prediction of Indoor Wireless Coverage by Leaky Coaxial Cable Using Ray Tracing", Bell Laboratories, Lucent Technologies, http://www.bell-labs.com/org/wire.

* cited by examiner

*Primary Examiner*—Thomas J Mullen
(74) *Attorney, Agent, or Firm*—Peter A. Haas, Esquire, LLC

(57) ABSTRACT

In one embodiment the present invention is an encoder for commissioning RFID transponders and includes a housing encasing a motor assembly, wireless communication means for transferring instructions and data from and to a remote host, on-board memory, a processor, and an antenna with corresponding mechanism to encode and verify a programmable RFID transponder within a protective enclosure. The present invention further includes novel methods for commissioning RFID transponders, as well as methods for recycling and reusing various components including the protective enclosure and RFID transponders.

36 Claims, 14 Drawing Sheets

FIG. 2
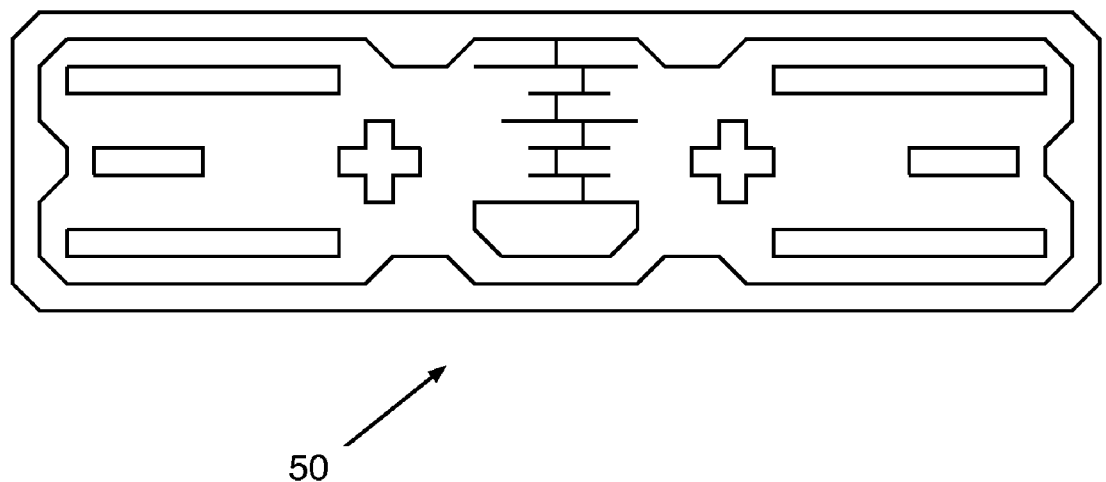
50
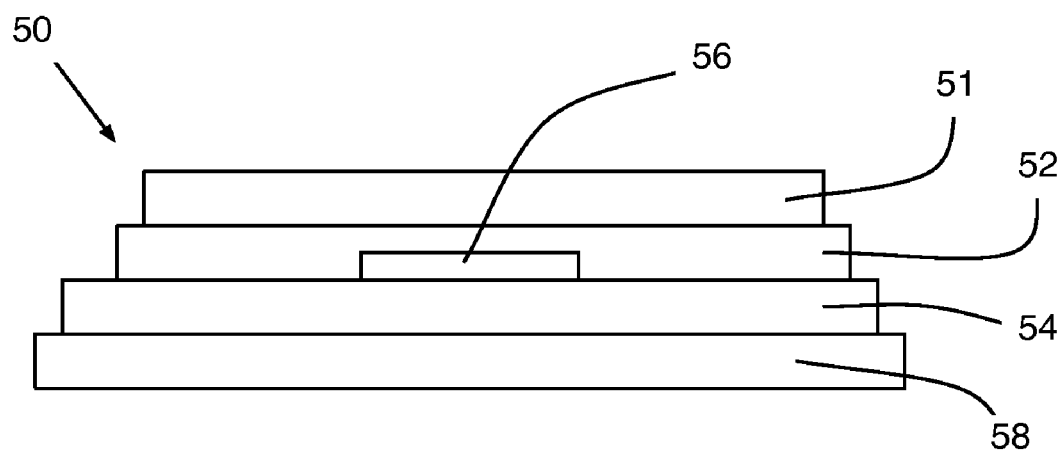
FIG. 3

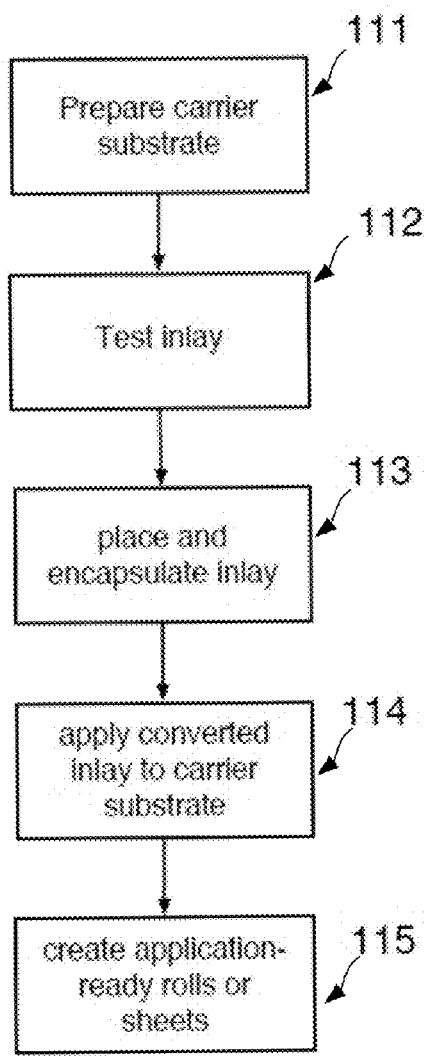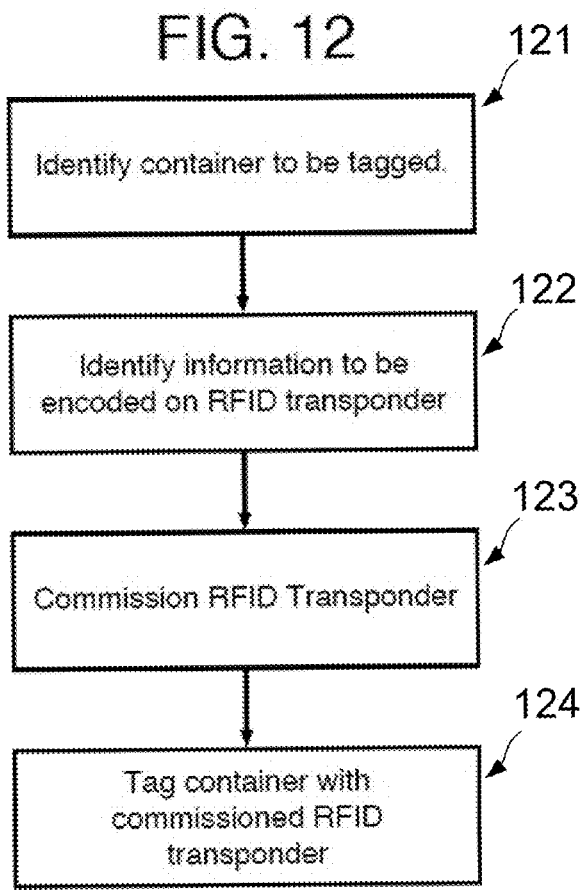

SYSTEMS, METHODS, AND DEVICES FOR CONVERTING AND COMMISSIONING WIRELESS SENSORS

RELATED APPLICATIONS

This document claims priority and benefit for all purposes of U.S. provisional patent application No. 60/709,713 filed on 19 Aug. 2005, entitled "Systems, Methods, and Apparatus for Converting and Commissioning Wireless Sensors" by the same inventor.

BACKGROUND

The present invention relates to a system, including methods and devices, utilizing wireless sensor devices and RFID (radio-frequency identification) transponders. Specifically, the present invention relates to a system incorporating novel devices and methods that enable point-of-use and on-demand commissioning of RFID transponder-equipped wireless sensors.

Radio-frequency identification (RFID) transponders enable improved identification and tracking of objects by encoding data electronically in a compact tag or label. And, advantageously, the compact tag or label does not need external, optically recognizable or human-readable markings. In fact, using the Gen2 EPC specification, a three-meter read-distance for RFID transponders is common—even on high-speed material handling lines.

Radio-frequency identification (RFID) transponders, typically thin transceivers that include an integrated circuit chip having radio frequency circuits, control logic, memory and an antenna structure mounted on a supporting substrate, enable vast amounts of information to be encoded and stored and have unique identification. Commissioning, the process of encoding specific information (for example, data representing an object identifier, the date-code, batch, customer name, origin, destination, quantity, and items) associated with an object (for example, a shipping container), associates a specific object with a unique RFID transponder. The commissioned transponder responds to coded RF signals and, therefore, readily can be interrogated by external devices to reveal the data associated with the transponder.

Current classes of RFID transponders rank into two primary categories: active RFID transponders and passive RFID transponders. Active RFID transponders include an integrated power source capable of self-generating signals, which may be used by other, remote reading devices to interpret the data associated with the transponder. Active transponders include batteries and, historically, are considered considerably more expensive than passive RFID transponders. Passive RFID transponders backscatter incident RF energy to specially designed remote devices such as interrogators.

Combining the benefits of the latest technology in RFID transponders with sensing devices, a broader class of devices called wireless sensors is emerging. Wireless sensors have a unique identity, sense one or more attributes within its environment, and report its identity and data corresponding to the sensed attributes. For example, a wireless sensor interprets environmental conditions such as temperature, moisture, sunlight, seismic activity, biological, chemical or nuclear materials, specific molecules, shock, vibration, location, or other environmental parameters. Wireless sensors are distributed nodes of computing networks that are interconnected by wired and wireless interfaces.

Wireless sensors, made using silicon circuits, polymer circuits, optical modulation indicia, an encoded quartz crystal diode, or Surface Acoustic Wave (SAW) materials to affect radio frequency or other signaling methods, communicate wirelessly to other devices. For example, certain embodiments of wireless sensors communicate on a peer-to-peer basis to an interrogator or a mobile computer. Communication methods include narrow band, wide band, ultra wide band, or other means of radio or signal propagation methods.

Additional examples of RFID transponders, wireless tags, and wireless sensors are more fully discussed in this inventor's co-pending U.S. Patent Application Publication No. 2006/0080819, entitled "Systems and Methods for Deployment and Recycling of RFID Tags, Wireless Sensors, and the Containers Attached thereto," published on 20 Apr. 2006, which is incorporated by reference for all purposes in this document.

One problem of prior-art systems, such as conventional print labels or barcode systems, includes a requirement for line of sight and an overdependence on the optical quality of the label. Many factors can render such a label unreadable including printing errors, excess ink, insufficient ink, physical destruction of the markings, obstruction of the markings due to foreign matter, and, in extreme cases, outright deception by placing an altered label over the top of such a print label.

RFID transponder labeling eliminates the need for an optically readable print label and overcomes all of the shortcomings related to print quality and the need for line of sight to scan the label. Moreover, RFID transponder labels enable secure data encryption, making outright deception considerably less likely to occur. However, current RFID label systems have their own limitations as well.

For example, certain prior art systems, as represented by U.S. Pat. No. 7,066,667 issued to Chapman et al. on 27 Jun. 2006 and include U.S. Pat. No. 5,899,476 issued to Barrus et al. on 31 May 2005, or by U.S. Pat. No. 6,246,326 issued to Wiklof et al. on 12 Jun. 2001, describe a device that commissions an RFID transponder with a printed label. This approach, however, introduces unnecessary waste, cost, and propensities for error. There is a growing category of applications that do not require anything other than a custom-encoded RFID transponder. This prior art calls for the inclusion of label printer hardware and related consumable materials that are not necessary for many RFID applications. Unneeded printer mechanisms create unnecessary complexities, size, and weight. In some instances this additional bulk hinders practical mobile applications.

United States Patent Application No. 2003/0227528 by Hohberger et al. published on 11 Dec. 2003 describes another attempt at improving demand-print labels by providing a device that combines two standard, die-cut rolls of media, one of which may be a roll of RFID transponders, and the second, print-label stock, in an attempt to provide on-demand smart labels. As with the aforementioned references, this approach adds unnecessary cost and complexity by combining RFID transponders with demand-printed labels.

So, despite recent advances in RFID technology, the state-of-the-art does not fully address the needs of efficient, economical, high-volume, cost-effective, reliable deployment and commissioning of RFID transponders and wireless sensors. And, large-scale adoption and deployment of RFID transponders depends on systems utilizing reliable, low-cost transponders and efficient commissioning means. Such systems should further include compliance with Gen2 EPC specifications or ISO standards, enable a plurality of printer-emulation modes, enable wireless connectivity—for example, in accordance with the IEEE 802.11b wireless LAN standards-based communications—provide various levels of WLAN security, efficient replenishment of programmable transponder supplies, and enable secure software re-programming to adapt to future demands and improvements.

SUMMARY OF THE INVENTION

The present invention overcomes the shortcomings of the prior-art attempts and, accordingly, provides systems, methods, and devices that commission RFID transponders on-demand and at a point-of-use utilizing wireless data transfer in a compact package that is well-suited to portable, mobile, or fixed use in multiple applications. Further advantages of the present invention will be well-appreciated by those skilled in the art upon reading this disclosure including the appended figures of the drawing.

For example, in one embodiment the present invention consists of an encoder for commissioning RFID transponders. The encoder consists of an RFID interrogator module adapted to enable encoding predetermined data according to a commissioning algorithm and communicating with an internal antenna, the antenna being adapted to encode the predetermined data on the RFID transponder; a memory storage device for storing at least a portion of the predetermined data; a processing means for controlling and communicating with the memory storage device, the RFID interrogator and the internal antenna; a means for providing a supply of RFID transponders, the transponders configured for tensile extraction from the encoder or, preferably from means for providing a supply of RFID transponders comprising a cartridge; and a means for presenting the RFID transponder within an operable range of the internal antenna or near field coupler to enable encoding of the predetermined data.

DRAWING

FIG. 2 is a top view of a possible RFID transponder according to one embodiment of the present invention.

FIG. 3 is a schematic end-view of the RFID transponder of FIG. 2.

FIG. 11 is a flow chart of a first method according to the present invention.

FIG. 12 is a flow chart of a second method according to the present invention.

DESCRIPTION OF THE INVENTION

Figure 1:
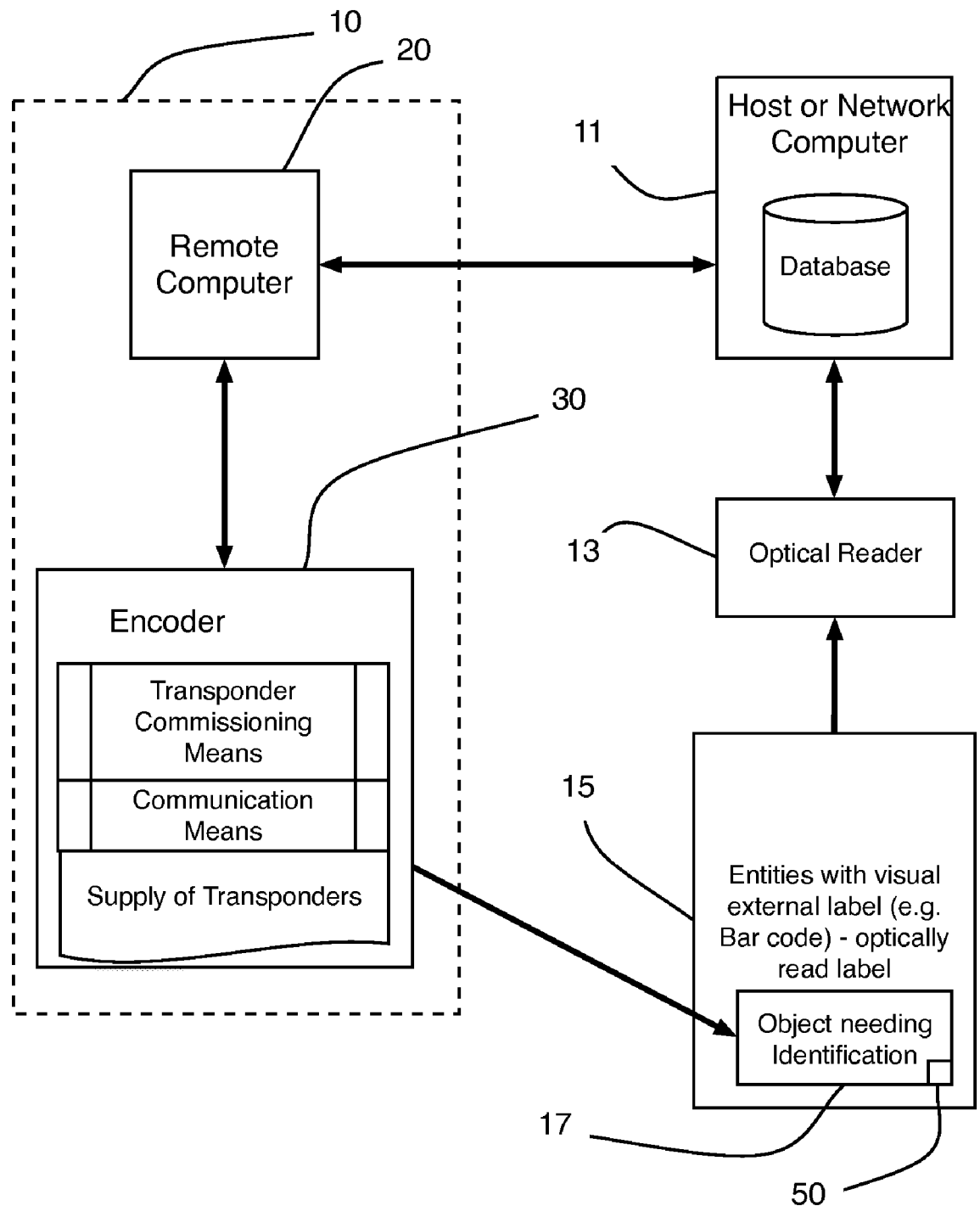
FIG. 1 is a block diagram of the system and environment according to one embodiment of the present invention.

Making reference to various figures of the drawing, possible embodiments of the present invention are described and those skilled in the art will understand that alternative configurations and combinations of components may be substituted without subtracting from the invention. Also, in some figures certain components are omitted to more clearly illustrate the invention. In some figures similar features share common reference numbers.

To clarify certain aspects of the present invention, certain embodiments are described in a possible environment—as identification means for containers. In these instances, certain methods make reference to containers such as loaded pallets, paperboard boxes, corrugated cartons, pharmaceutical containers, and conveyable cases, but other containers may be used by these methods. Certain embodiments of the present invention are directed for use with commercial corrugated shipping cartons, tagged pallet-loads of shrink-wrapped cases, consumer-goods packaging, consumer goods, or other methods of identifying objects using RFID transponders or wireless sensors, or both.

Some terms are used interchangeably as a convenience and, accordingly, are not intended as a limitation. For example, transponders are used interchangeably with the term tags and the term inlay is used interchangeably with inlet. This document generally uses the term tag to refer to passive inlay transponders, which do not include a battery, but include an antenna structure coupled to an RFID chip which are generally a thin and flat and substantially co-planar and located on a substrate. One common type of passive inlay transponder further includes a pressure-sensitive adhesive backing positioned opposite an inlay carrier layer. However, certain aspects of the present invention work equally well with active inlay transponders. A third type: a battery-assist tag is a hybrid RFID transponder that uses a battery to power the RFID chip and a backscatter return link to the interrogator. Further, this document uses programmable RFID transponders interchangeably with RFID transponders. Programmable transponders enable data to be written or stored more than once.

Suitable environments or applications for certain aspects of the present invention include: Traditional conveyor line or other high-speed machinery with automated transponder printing, encoding, and attachment; Hand attachment of transponders (a method that often is referred to as "slap and ship"; and a novel category of mobile transponder encoders as will be more fully described herein).

The systems, methods, and devices of the present invention utilize an RFID transponder or wireless sensors as a component. Certain RFID transponders and wireless sensors operate at Ultra High Frequencies (UHF), the band of the electromagnetic spectrum that, for RFID applications, spans from about 860 MHz to 960 MHz. Transponders and tags responsive to this frequency band generally have some form of one or more dipoles in their antenna structure. Such RFID transponders and wireless sensors utilize any range of possible modulation schemes including: amplitude modulation, amplitude shift keying (ASK), double-sideband ASK, phase-shift keying, phase-reversal ASK, frequency-shift keying (FSK), time-division multiplexing (TDM), or Ultra Wide Band (UWB) method of transmitting radio pulses across a very wide spectrum of frequencies spanning several gigahertz of bandwidth. Modulation techniques may also include the use of Orthogonal Frequency Division Multiplexing (OFDM) to derive superior data encoding and data recovery from low power radio signals. OFDM and UWB provide a robust radio link in RF noisy or multi-path environments and improved performance through and around RF absorbing or reflecting materials compared to narrowband, spread spectrum, or frequency-hopping radio systems. Wireless sensors are reused according to certain methods disclosed herein. UWB wireless sensors may be combined with narrowband, spread spectrum, or frequency-hopping inlays or wireless sensors.

A. System Overview

The present invention includes a system for commissioning wireless sensors at a point of use and on-demand. For example, in one embodiment, the present invention incorporates a mobile encoder device, which may be attached to a belt of an operator and powered by rechargeable batteries 60. The mobile encoder is in wireless communication with a remotely located host computer. The operator can selectively (on-demand) enable the mobile encoder to commission a transponder based on various criteria, including input received from a mobile bar-code scanner, for example.

FIG. 1 shows one system 10 according to the present invention in a typical environment, such as a packaging facility wherein a collection of entities with visual external labels 15 exist and a sub-set (or all entities) need to be associated with a wireless RFID transponder, tag, or label. The object 17 needing an RFID transponder could be a packing container having an assorted collection of entities 15. As entities 15 are pulled from the collection, a traditional optical reader 13 (human or machine) interprets the visual external label. Information from the external, visual label is correlated to information stored in a centralized location, represented by a network computer 11 having a database. The information taken by the optical reader 13 is transmitted to the network computer 11. System 10 includes a wireless connection between the remote computer 20 and the mobile encoder 30 either directly or through a common wireless access point. Additionally, a wireless connection could occur between the remote computer 20 and the host computer 11, and in this embodiment, the remote computer 20 is in physical connection with the mobile encoder. In yet another embodiment, the remote computer 20 wirelessly connects to both the mobile encoder 30 and the host computer 11. Optionally, the optical reader 13 can be incorporated in the encoder 30. In these aforementioned embodiments, the mobile encoder 30 is a portable device that can be easily carried by a human operator. As such, the mobile encoder 30 includes an internal power source 60 such as a rechargeable lithium-ion battery and would further include a handle or a belt-clip for ease of use. In another embodiment, the mobile encoder can be attached to a high-speed conveyor line. In such an application, the on-board battery could be replaced or augmented by a physical connection to a remote power source. Further, the computer 20 could have wired connects to the host network 11. Further details of possible configurations of the mobile encoder will be further detailed in subsequent sections of this disclosure.

In the system 10 of FIG. 1, the mobile encoder 30 carries a supply of un-commissioned (or blank) RFID transponders. Once the desired data is accumulated and presented to the encoder 30 from the computer 20, the encoder commissions an RFID transponder, creating an RFID tag or label 50 for the object 17. The commissioned tag or label 50 can then be applied, linked, or otherwise associated with the object by known means including a human operator or a machine transfer.

B. RFID Transponders

FIG. 2 shows a possible RFID transponder 50. RFID transponders, essentially, comprise an RFID integrated circuit (IC) device (or "chip") bonded to an antenna apparatus, formed on a substrate that is often plastic such as Mylar®, polyester, or PET. One way to form an antenna structure is to etch copper from a substrate. An alternate way includes printing multiple layers of conductive ink onto a substrate. One additional method includes stamping UHF antennae from thin sheets of aluminum. In certain embodiments, RFID transponders and wireless sensors are recovered from waste streams for reconditioning, reprogramming, and reuse.

Other suitable RFID transponders include designs that combine a dielectric spacer behind the antenna to create a transponder that performs well over a broad range of packaging conditions. A robust design also includes features to protect the transponder from damage.

In certain embodiments, the RFID transponder is both programmable and mechanically configured for tensile extraction from a protective enclosure.

In one embodiment, additional transponder layers include a thin and flexible energy cell comprising two non-toxic, widely-available commodities: zinc and manganese dioxide. One suitable energy cell is developed by Power Paper Ltd. of 21 Yegia Kapayim Street, Kiryat Arye, Petah Tikva, P.O.B. 3353, ISRAEL 49130, and incorporates an innovative process that enables the printing of caseless, thin, flexible and environment-friendly energy cells on a polymer film substrate, by means of a simple mass-printing technology and proprietary inks. The cathode and anode layers are fabricated from proprietary ink-like materials that can be printed onto virtually any substrate, including specialty papers. The cathode and anode are produced as different mixes of ink, so that the combination of the two creates a 1.5-volt battery that is thin and flexible. Unlike conventional batteries, this type of power source does not require casing.

A top layer of an RFID transponder assembly comprises a paper face-stock, which is a very low-cost material but also is the least environmentally resilient. UV-resistant plastic facestock generally provides the best survivability in outdoor and rough-service environments, and also provides the best protection for the RFID transponder assembly.

A bottom layer of pressure-sensitive adhesive (PSA) often is used for attachment of transponders to objects and often is referred to as a wet inlay or a wet tag or a wet transponder. Alternatively, a layer of clear, translucent, or opaque adhesive-backed film or tape is used to attach the transponder or wireless sensor to object or container. The tape, any thin, low cost, flexible material with a self-adhesive backing, such as a conventional packing tape, is well-suited for this method of attachment. The tape may be formed into various shapes to achieve the requirements of this method. Certain embodiments may use tape that is preprinted with certain logos, marks, symbols, bar codes, colors, and designs. Suitable adhesive-backed tape must not—or at least minimally—absorb radio frequencies within the range of frequencies used by the transponder or tag. The tape material, also, must not corrode the device or otherwise hamper its functionality.

Certain embodiments use a type of packing manufactured specifically for a given encoder. Packing tape can be single-coated pressure-sensitive adhesive tape or, alternatively, media constructed with multiple layers including a backing layer. Certain backing layers are constructed on a plastic film having one or more layers. Certain backing layers are made from plastic resins such as polypropylene (PP), polyethylene (PE), or copolymers of PP, PE, PVC, polyesters, or vinyl acetates. Certain embodiments of PP are mono-axially oriented polypropylene (MOPP), bi-axially oriented polypropylene (BOPP), or sequentially and bi-axially oriented polypropylene (SBOPP). Certain backing layers are biodegradable. Certain backing layers are coated with a pressure sensitive adhesive on one side and a low adhesion release coating on the other side to reduce the amount of power required for the encoder to unroll the tape for application.

FIG. 3 shows a possible embodiment of an RFID transponder 50 that does not include an encapsulation layer comprising a separate tape. In this example, an adhesive layer 52 bonds with antenna layer 54 that is bonded to inlay substrate layer 58 and integrated circuit 56. Inlay substrate layer 58 and face-stock layer 51 provide resistance against electrostatic discharge (ESD) into antenna layer 54 or chip 56.

Other constructions for RFID transponders include one or more additional layers of high-dielectric material that encapsulate or substantially cover the inlay. In general, the thicker the dielectric layer the higher the voltage must be to initiate a flow of electrons through a dielectric layer. This results in higher ESD voltage ratings. Also, it is well known to those skilled in the art that thicker dielectric layers between antenna layer 54 and any other metal or liquid also tends to reduce parasitic loading of the antenna whereby maintaining antenna tuning for proper coupling to interrogators within a specified UHF band. In such embodiments, the integrated circuit chip and antenna bond to an adhesive layer and are protected from a discharge path through the tape layer by its particular thickness of dielectric material. A second dielectric layer bonds to the inlay substrate by a second adhesive layer, so that a low voltage discharge path is nonexistent around the two layers of tape substrate.

In another possible embodiment of an RFID transponder, the inlay substrate provides a second layer of ESD resistance against a discharge path through an outward-facing tape layer and associated adhesive layer. This construction protects the antenna and chip from electrostatic discharge originating from any direction. The encapsulation tape layer bonds to the antenna and chip via an adhesive layer and provides no adhesive bond to the transport container when the transponder is commissioned, and therefore depends on separate adhesive zones to attach to the container of interest.

In another possible embodiment, an RFID transponder includes multiple layers of ESD resistant material. For example, an outer layer substrate bonds to an inner substrate by an intermediate adhesive layer. A second adhesive layer bonds with the chip and antenna. The inlay substrate faces inward and presses against a transport container when the transponder is commissioned.

The contemplated adhesives in the various RFID transponder embodiments create strong and permanent bonds between tapes and inlay layers over a certain practical range of operating temperatures.

Because RFID transponders are designed to adhere to a container, one face of an external layer includes a pressure-sensitive adhesive. This external adhesive, however, must not cause mechanisms associated with the commissioning devices to jam. To prevent unwanted sticking of the RFID transponder, a transport layer protects the sticky, external adhesive. The transport layer is either a release liner such as a silicone-treated paper liner or a net (or mesh) web. A net or mesh web offers two principal advantages: less weight and being recyclable or reusable. A comparison of the weight of a net with a higher percentage of open area to a typical sheet of release liner reveals that the netting is lighter for any given section of comparable size. Environmental problems of disposal of release liner are well known. Mesh or netting, comprised of recyclable resins, is recovered after each use so that the mesh or net can be either reused or recycled for its constituent materials.

In one possible embodiment the mesh or netting is made of plastic such as nylon, polypropylene, polyethylene, HDPE, Teflon, or other resins. In other embodiments the mesh or netting is fabricated from metal or carbon-impregnated plastic to provide a conductive path to bleed electric charge away from points of accumulation.

Other advantages of a net or mesh transport layer include a substantial percentage of the adhesive not in contact with anything during storage and commissioning. When stored in a roll, a small percentage of the adhesive layer makes contact with the backside of the roll through the openings in the mesh. Thus, a small amount of energy is required to unroll the spool during transponder commissioning, yet there exists a certain amount of adhesion to prevent a converted spool from unraveling.

In other possible embodiments, the RFID transponders can include a surface suitable for human or machine readable, visible, external markings including bar-code symbols or alpha-numeric sequences.

Figure 4:
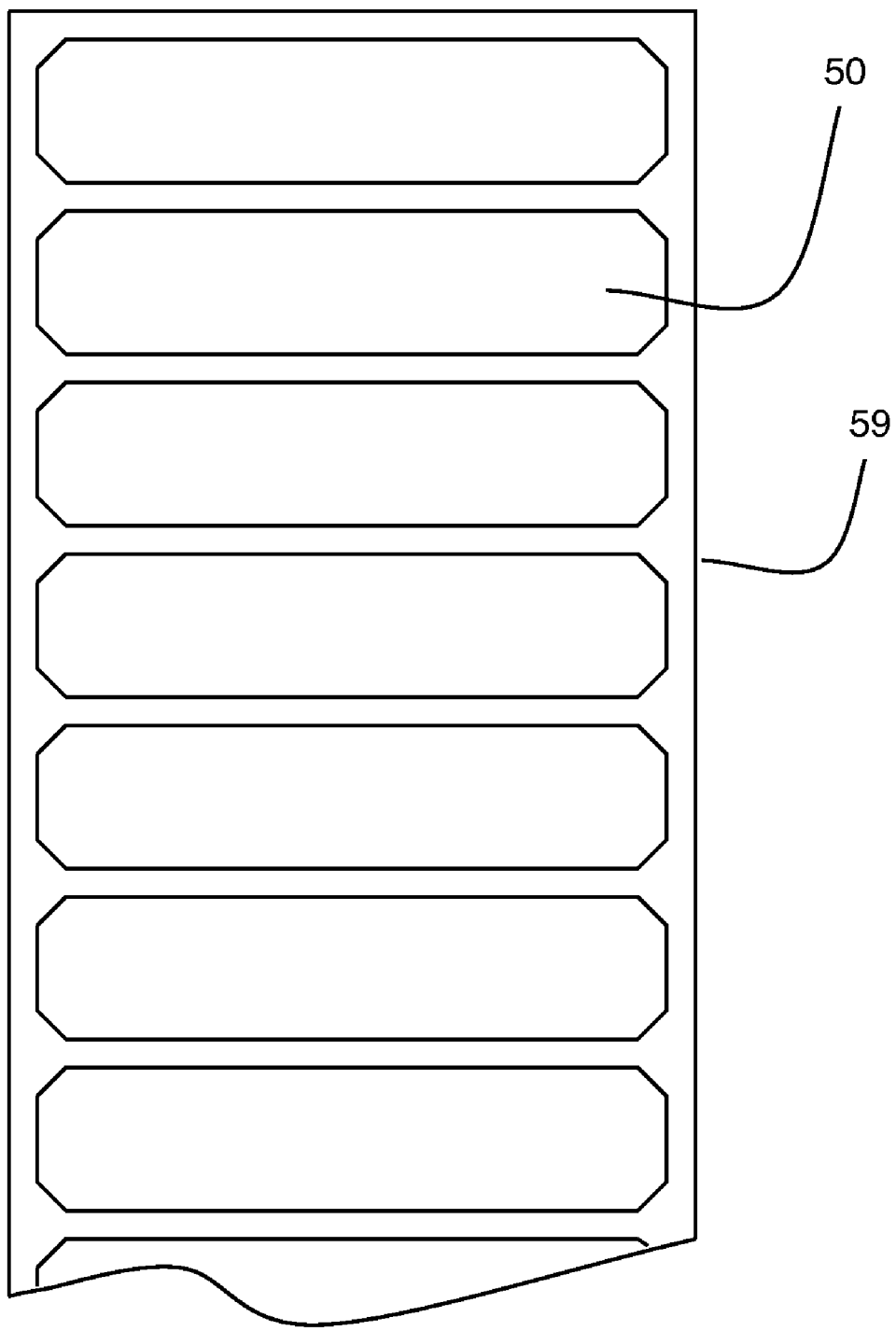
FIG. 4 is a top view schematic drawing of a sheet or roll of a plurality of RFID transponders of FIG. 3.

FIG. 4 shows another embodiment of RFID transponders 50 grouped on sheet stock 59 such as rolls or z-folded sheets that enables a plurality of transponders to be carried on a continuous web or traditional release liner. Other certain embodiments use transponders that are stacked and loaded into magazines for transport, handling, and automated dispensing. In certain embodiments, the magazines contain metallic shielding to protect transponders and inlays from electrostatic discharges (ESD).

Figure 10:
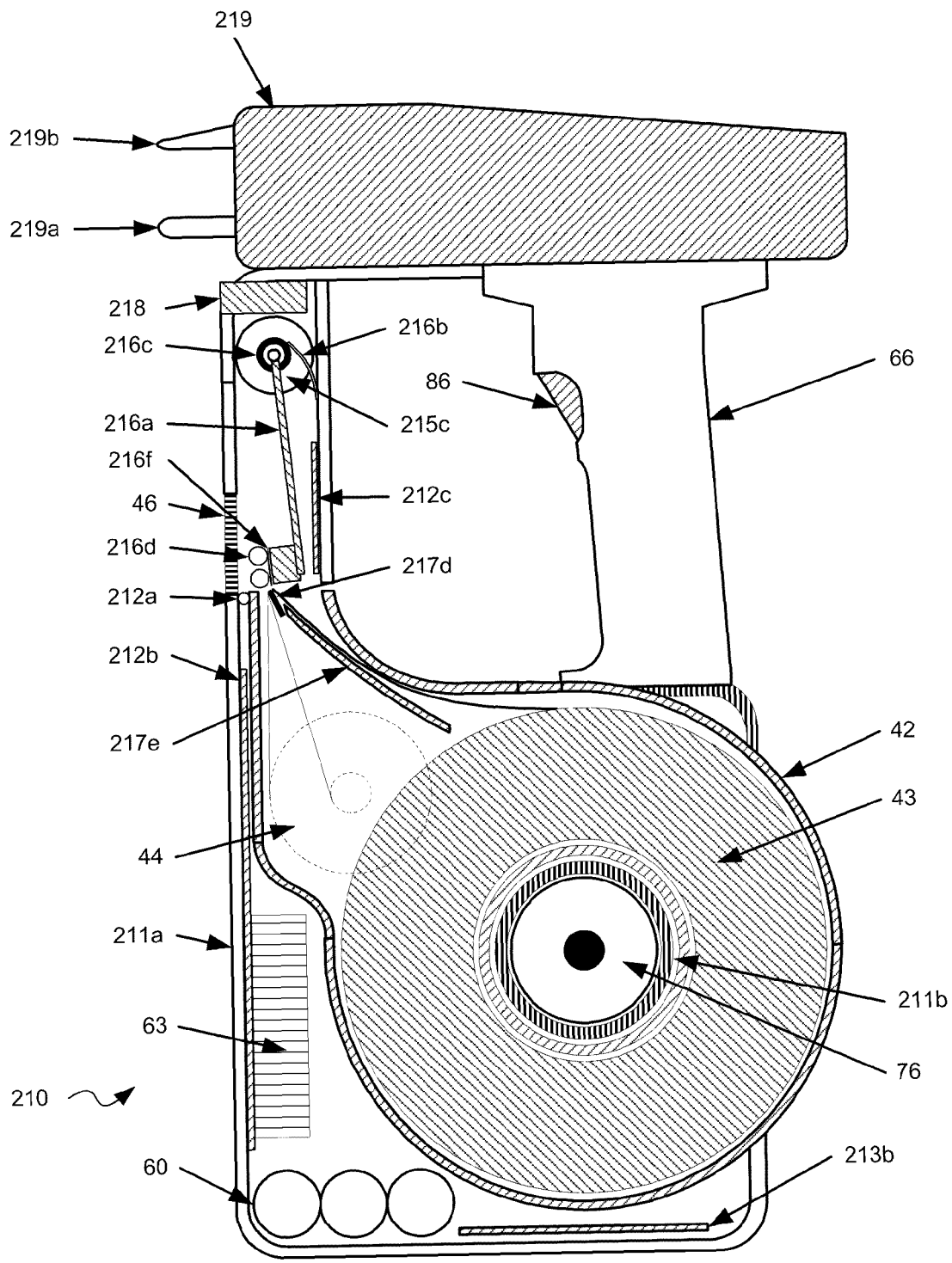
FIG. 10 is a schematic cross section of another encoder according to the present invention.

In certain embodiments an RFID encoder is combined with a sensor suite 218 as shown in FIG. 10 to enable semi-automated tag application to desired objects. In one embodiment, a semi-automatic encoder/applicator is created by integrating a single sensor device. The sensor responds to changes in light, capacitance, pressure, acoustics, or optical path length to a transport container. In another embodiment a suite of sensors are used to detect the attachment location of a commissionable transponder.

For example, changes in capacitance are detectable using certain QProx charge transfer capacitance sensors available from Quantum Research Group Ltd. of Hamble, England. Ultrasonic range sensors are available from supplier such as muRata Manufacturing Co., Ltd. of Kyoto Japan under the trade name Piezotite. Optical path length sensors are available from Keyence Corporation of Osaka, Japan. Sharp manufactures a compact distance-measuring sensor GP2D02 that is responsive in the range from 5 to 100 cm. Thus, when a predetermined set of conditions is realized, the sensor triggers, enables, or selects a desired action. In one embodiment, proximity or contact of sensor suite with the targeted transport container causes a second type of Trigger Event, resulting in the commissioning and dispensing of a transponder by an encoder.

In other embodiments, sensor 218 is designed to determine the distance an encoder resides from an object that is to be tagged. Range information is acquired and processed in real time to determine if the encoder is in Close Proximity, Near, or Far from a transport container. In certain embodiments a controller is programmed to alter threshold distances between each range category and to associate a function with each range. In certain embodiments, range category Close Proximity is associated with transponder programming and application functions. For example, the range category Near is reserved for transponder verification and/or reading functions; and Far is reserved for bar code scanning functions to verify that bar code information aligns properly with RFID transponder data.

In other embodiments a sensor suite is responsive to certain colors or patterns and uses that information to instruct the placement or detect the correct locations for applying good transponders and separate locations for discharging bad transponders.

C. Mobile Encoder

FIG. 1 shows a system 10 according to one embodiment of the present invention including a mobile encoder 30. And, FIG. 5 details one possible mobile encoder 30. In this embodiment, the encoder can attach to the belt of an operator, accordingly, mounted on the housing 32 is a belt mounting means such as belt-clip 34, which easily adjusts for left-handed or right-handed operation and corresponding mounting on the belt (not shown) of the operator. An external antenna 36 enhances wireless connectivity to a host or network computer (not shown in this view), or to a remote-mounted computer device such as a PDA or bar code reader. Several operator indicator lights including a system-ready LED 37, data-ready LED 38, tag-ready LED 39, and battery-ready LED 40 mount on the housing enabling the operator an easy view of the device status.

Also included on the exterior of the housing are an external, power-cord receptacle 41 so that the on-board lithium-ion battery may be charged as required. A combination on/off-next switch 33 enables the operator to selectively power up the encoder. A reset port, such as a recessed reset button (not shown in this view), enables an operator to reset the software settings of the device as required.

A cartridge 42 containing a plurality of RFID transponders releasably mounts to a face of the housing 32. The cartridge further includes a take-up reel 44 for non-dispensed RFID transponders, a port 46 (above take-up reel 44 but not shown in FIG. 5) for dispensing commissioned transponders, and a supply reel 43 for holding blank RFID transponders prior to commissioning.

Figure 9:
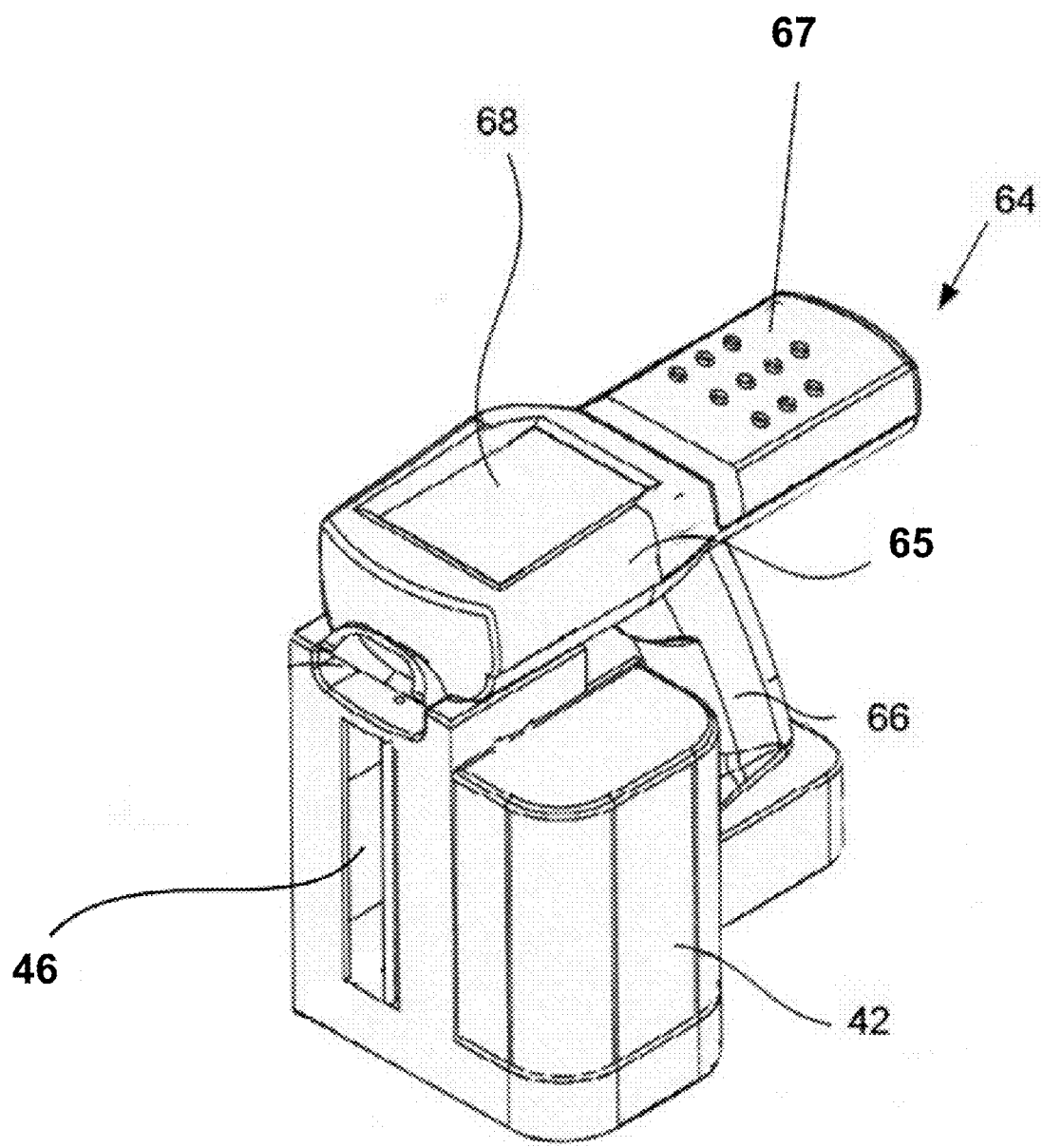
FIG. 9 is a frontal-offset view of a hand-held, mobile encoder according to the present invention.

In one alternative embodiment, the mobile encoder 64 includes a handle (as FIG. 9 shows, for example) for hand operation of the encoder. In another contemplated embodiment, the mobile encoder is fixed to an assembly line in a stationary manner. Accordingly, the stationary-mounted encoder further includes machine-controlled devices for extracting a commissioned RFID transponder from the encoder and places the transponder on the container of interest by means well understood in the art.

In the aforementioned embodiments of the mobile encoder 30 (or hand-held encoder 64 of FIG. 8 or FIG. 9, for example) key features commonly shared include means for enable Gen2 EPC compliance and multiple printer-emulation modes. On-board power source 60, such as a rechargeable lithium-ion battery enables freedom of movement as does means for wireless connectivity to a data network, such as the 802.11 wireless LAN (Wi-Fi) standards-based communications protocol. However, a conventional power source that requires connectivity to a power-grid and a cable-based data network connectivity link would work under certain circumstances.

Further, in contemplated embodiments, the fixed or mobile encoder enables selective mounting to a magazine or cartridge filled with un-commissioned RFID transponders, which facilitates rapid and easy loading of the encoder with ready-to-use RFID transponders and further enables re-use, re-commissioning, and recycling of un-dispensed transponders and the associated cartridge. The mobile encoder can be monitored and controlled by virtually any handheld or mobile device, a host computer in a central location, or over the Internet.

Certain features and methods described and explained with relation to handheld applicators are also relevant to non-mobile RFID tag applicators that use a magazine, cartridge, reel, or roll to handle, transport, and dispense RFID tags, inlays, transponders, or wireless sensors. Magazines, cartridges, reels, and rolls are preferably capable of carrying either new or used tags and are preferably capable of being used in either mobile or nonmobile applicators. Magazines, cartridges, and reels are preferably refilled and reused. Magazines and cartridges preferably protect RFID tags from ESD.

Cartridges preferably indicate their empty/full status with a visible indicator such as: an LED, an LCD, a mechanical flag, a window with a view into the source reel, or other such indicators that help an operator choose which cartridge from which to next consume tags.

The mobile encoder 30 is activated (turned on) when an operator selectively depresses the combination on/off-next switch 33. However, depressing the on/off-next switch for about three seconds or longer results in a sleep-mode cycle that can be interrupted by re-pressing the on/off-next switch. In sleep mode the operator indicators (LEDS 37, 38, and 39) will turn off. If active, the mobile encoder system-ready LED 37 illuminates and connects to the assigned network. Network connectivity results in the illumination of both the system-ready LED 37 and the data-ready LED 38. The encoder receives commands and data via the wireless link from the remote computer 20 or host network computer 11 (of FIG. 1). The data represents information to be encoded on an RFID transponder. The information is stored in the encoder's on-board memory and the tag-ready LED 39 rapidly blinks green (cycles on/off to pulsate). An RFID transponder is moved from within the cartridge 42 to a position on the top edge of the cartridge for encoding in the encoder and the transponder is encoded with the appropriate information. The transponder is tested and if it is good—contains the data and encoding was successful—all three indicator LEDs indicate a solid-green color. The operator removes the encoded RFID transponder from the encoder and places it on the container of interest.

In the event that the encoding process failed, the bad transponder is detected and retained by the encoder, where it remains on the take up reel 44 inside the cartridge 42. The take up reel also collects the release liner as the encoder 30 dispenses good transponders (properly encoded RFID transponders). The take up reel returns to a re-cycling center where components are re-used or recycled as necessitated. Further, the re-cycling center can perform failure analysis on returned transponders.

Figure 6:
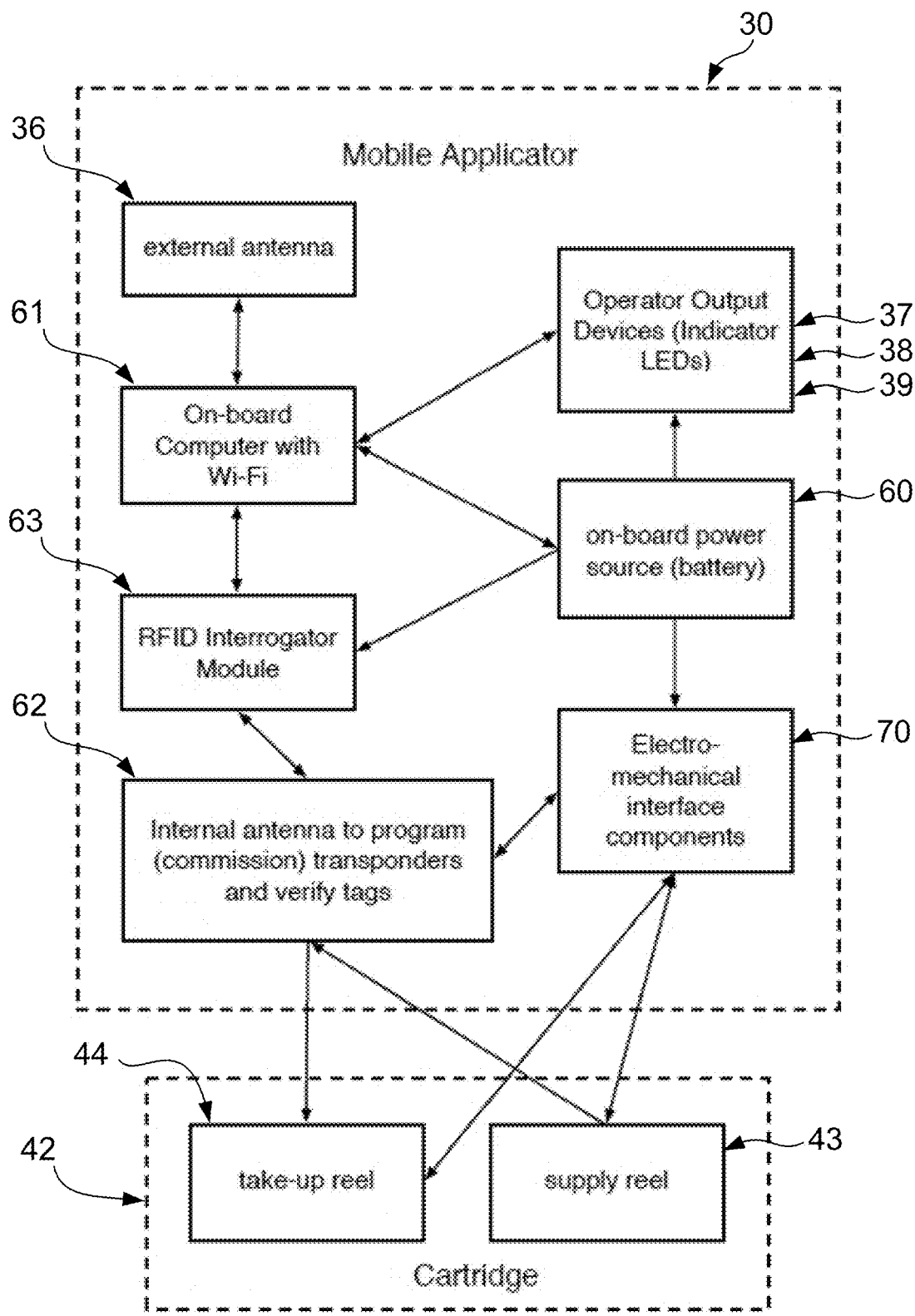
FIG. 6 is a schematic block diagram showing some components of the mobile encoder of FIG. 5.
Figure 7:
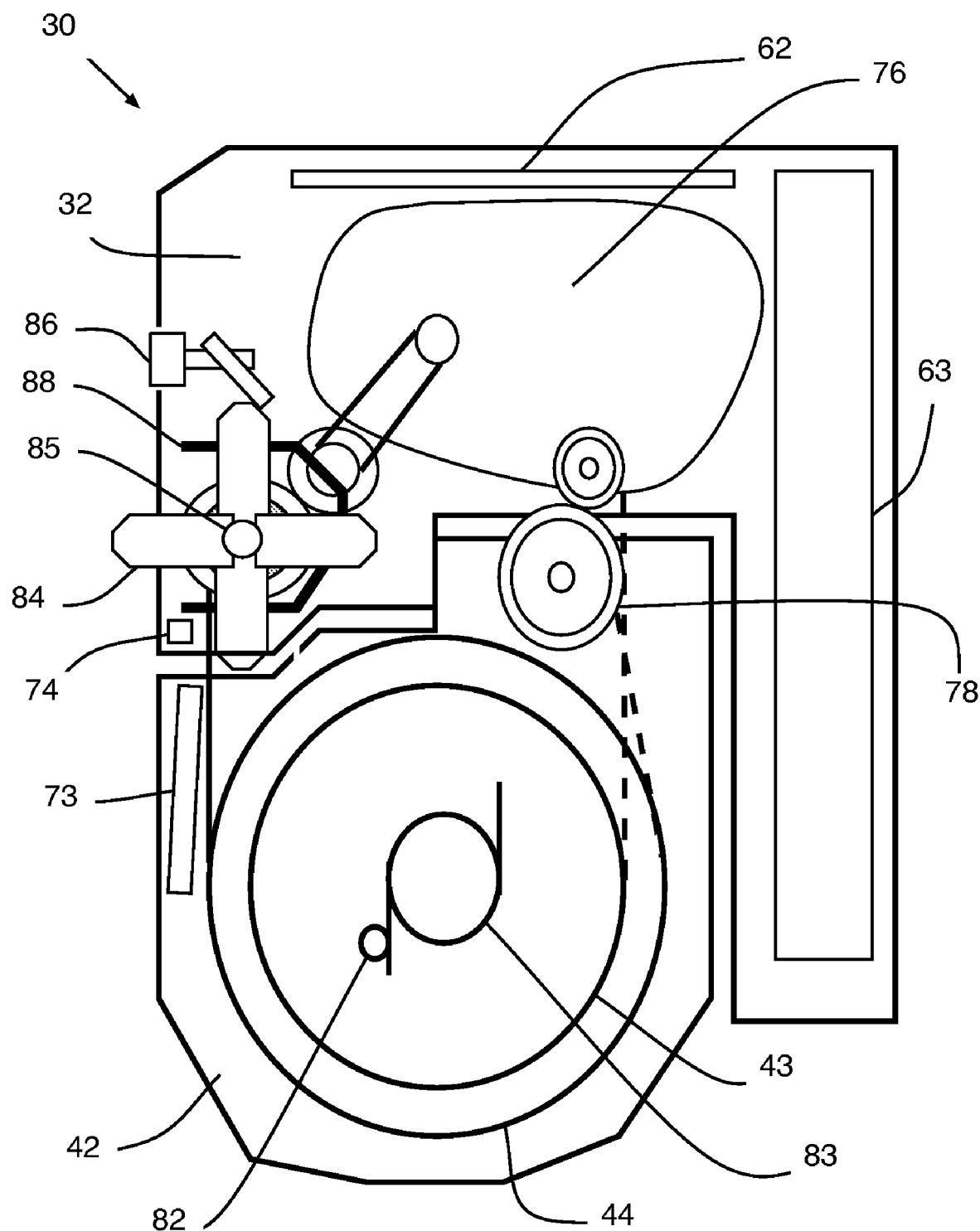
FIG. 7 is a schematic cross section view showing electro-mechanical components of one embodiment of a mobile encoder.

FIG. 7 is a schematic diagram of additional electro-mechanical components 70 (as generally referred to in FIG. 6) and logic components of a possible encoder 30. An RFID Module 63, such as a MP9311 UHF reader module available from Sirit Technologies, 1321 Valwood Parkway, Suite 620, Carrollton, Tex., 75006, USA, communicates with a vertical polarized YAGI antenna 62 with a downward side lobe to low-power program (commission) RFID transponders to create an RFID transponder, and the same downward side lobe and verify transponders at low power also can read far-field transponders at a higher, second power. Additional components include a mechanical paddle trigger 86 for operator-selected override of the reel of RFID transponder stored in the supply or source reel 43 in the cartridge 42. A drive motor 76 coupled to a dual output shaft gearbox drives the source transponder reel 43 via an intermediate take-up reel gear interface 78 at the cartridge mouth. Another gear assembly along with a spring couple 85 advances and positions the tag feeder paddle 84 with feedback from paddle position sensor 88. A tag sensor 74 detects the location of the RFID transponder to-be commissioned by the YAGI antenna 62. As the reel of RFID transponder advances inside the encoder, the lead edge passes the ratchet post 82. If the now-commissioned transponder is read by the antenna 62 as "good", a ratcheting-back torque spring 83 enables a peel device, such as the shield and tag peel edge 73, to engage, forcing the commissioned tag to peel away from the carrier layer, which continues on to the take up reel 44. In the event of a "bad" tag—that is, the antenna 62 reads the RFID transponder and determines an error has occurred—the shield 73 does not engage, allowing the defective transponder to remain on the carrier layer and proceed to the take-up reel. Once the good transponder is removed from the encoder, the tag sensor 74 detects the condition and enables the encoder to stand-by for the next event. Transponders are read, written, and verified when an operator initiates an action such pulling a trigger 86, pushing a button, or some other command sequence.

Certain protective enclosures, such as cartridges 42 or magazines, are part of a family of interchangeable magazines of similar size, shape, and functionality, which are capable of housing and dispensing certain types, styles, shapes, and sizes of new or used RFID transponders. In at least one embodiment, the magazine or cartridge 42 includes a unique and embedded, RFID transponder which enables automatic interrogation and tracking of cartridge 42. In certain embodiments, to minimize interference, the cartridge-specific and unique RFID tag or RFID transponder operates in a frequency band that is different than the supply of RFID transponders contained within the protective enclosure. Alternatively, other embodiments selectively interrogate cartridge identification transponders that operate in the same band as transponders within the cartridge that are to be applied.

Certain encoders require replenishment of the battery or other internal, on-board power source 60, such as a fuel cell, or other energy storage technology. Accordingly, in some embodiments, an encoder 30 (or encoder 64 or encoder 210 of FIGS. 8, 9, and 10) further includes a remote, selectively coupling base unit. The base unit enables a replenishment of magazines or cartridges, provides replaceable power sources, recharges the on-board power source, serves as a communications gateway, and provides a user interface for programming and maintenance of the encoder. For example, spare transponder magazines/cartridges are retained in cartridge pockets where they are protected from damage. Cartridges indicate their empty/full status with a visible indicator such as: an LED, an LCD, a mechanical flag, a window with a view into the source reel, or other such indicators that help an operator choose which cartridge from which to next consume transponders. The encoder, also, is retained by a protective pocket to prevent damage and to make any required electrical or mechanical connections to the base unit. In some embodiments a base unit mounts to diverse operating locations including various models of fork lift trucks. In such applications, the base unit includes a variety of wired and wireless communications options to enable omni directional communication with the encoder, cartridges, a host computer, vehicle mount terminal, a fork truck computer, or other relevant computing devices. The base unit includes a power system that is suitable for the application, including power filtering and energy storage capabilities such as batteries or fuel cells.

As with all ESD-sensitive equipment, care must be taken to avoid a build-up of damaging electrostatic charges. Accordingly, in certain embodiments charge is removed using a variety of conduction methods including wiping, air, and humidity controls.

In some embodiments, the encoder adapts to use a particular type of RFID transponder. One type of suitable RFID transponder is model number AD-220 from Avery Dennison of Brea, Calif. or, alternatively, Raflatac model 300846 from Tampere, Finland. Such a transponder is die cut and adhered to release liner. Additionally, wireless sensors are manufactured to specifications that are compatible with the specific encoder, including such specifications as core diameter, outer diameter, and web width. Alternatively, certain steps are required to prepare a standard roll of ALL-9338-02 tags for use in an automated encoder, including unrolling from a large roll (up to about 6-inches in core diameter) onto several smaller rolls having a smaller core diameter (of about 1-inch to about 2-inches in core diameter).

Encoder 30 communicates with a remote computer and includes options to physically, electrically, and communicatively integrate with a portable data terminal (PDT) or a mobile computing platform. Certain PDT's have a variety of wireless connections including PAN and WLAN. Certain PDT's include a barcode scanner comprising a laser, an imager, or other means. In other suitable PDT's an RFID interrogator and antenna are built-in, while certain others have a card slot manufactured to a standard such as PCMCIA, CompactFlash, or Secure Digital, into which interrogator/antenna is plugged into. An example of such a card is the MPR 5000 that plugs into a PCMCIA Type II slot and is available from WJ Communications of San Jose, Calif. The MPR 5000 is compatible with handheld computers such as the Hewlett Packard iPAQ5550 or other models that accommodate smaller card-form factors, enabling them to read and write EPCglobal or ISO 18000 compatible UHF RFID transponders.

Other events, information, and status—such as changes in transponder readiness, transponders remaining on the source roll, remaining charge in the battery, changes in range-status between certain predefined states such as Close, Near, and Far—are communicated to the associated PDT. Other possible information, including certain power management functions, commands, status, and data-to-be-encoded into each readied transponder, is provided to the PDT over a wireless connection. Such a configuration puts the encoder in the role of a peripheral device to the PDT 219, with PDT 219 managing the primary user interface and most computation functions.

In some embodiments the encoder adapts to exchange information with a host device, including a PDT, in either a batch-mode or through a real time connection. Batch mode uses a periodically connected data transfer channel such as a wired connection. Certain wired connections include serial data, infrared, optical, Universal Serial Bus, a parallel port, or other physical data connection. Certain real-time connections include wireless data links including Personal Area Network (PAN), Wireless Local Area Network (WLAN), and Wide Area Network (WAN). Certain PAN connections include Bluetooth and Zigbee. Certain suitable WLAN connections include IEEE 802.11a, IEEE 802.11b, and IEEE 802.11g.

For certain encoder embodiments passwords are encoded into transponders or wireless sensors when they are commissioned. Passwords are safeguarded using cloaking, obfuscation, cryptographic techniques, secure and trusted channels, locked memory, and other methods that are commonly used to protect confidential information. Passwords are generated or retrieved from data encoded in an RFID transponder to generate an index into one or more databases that contain a one dimensional array of passwords, a two dimensional array of passwords, a multidimensional array of passwords, or an array of actual or pointers to algorithms used to generate passwords from transponder data, for example. Alternatively, cryptographic algorithms are used to generate passwords from transponder data.

Although this disclosure makes specific reference to a mobile encoder, it is understood that the encoder can easily adapt and be readily configured to a fixed operating environment. For example, it can be mounted to a forklift truck or a high-speed conveyer line and maintain advantages of wireless communication, rapid change-over and other qualities as discussed and developed more fully in this disclosure.

D. Interrogator Apparatus

Working as a stand-alone device, or combined with an encoder, certain embodiments of the present invention include an RFID transponder reader, also called an interrogator. The interrogator, in one embodiment, is a physically separate device that is solely in wireless communication with the encoder. In another embodiment the interrogator includes a wired connection to the encoder. In yet another embodiment, the interrogator connects to the encoder via an intermediate processor, such as a remote computer, or some other intermediate device. In yet another embodiment, the intermediate device is a shared processor in a physically integrated encoder/interrogator apparatus.

Regardless of the physical configuration of the interrogator, its function is to encode and/or verify a RFID transponder's (including wireless sensors) functionality. Certain embodiments use a mobile handheld reader to verify transponder functionality after carton attachment. Certain handheld readers also read bar codes that either partially or completely specify the data that is to be programmed into a transponder. Accordingly, an optical path from the interrogator to a location for reading bar code labels is used to identify certain information about the objects or containers that are to be tagged. Additional transponder encoding instructions and data is acquired through an integral network interface or a batch mode memory in the interrogator.

In certain embodiments, a shield structure incorporated in a combined interrogator/encoder prevents RF fields from interrogating or reprogramming RFID transponders yet-to-be-commissioned that are resident in the combined interrogator/encoder device.

Figure 8:
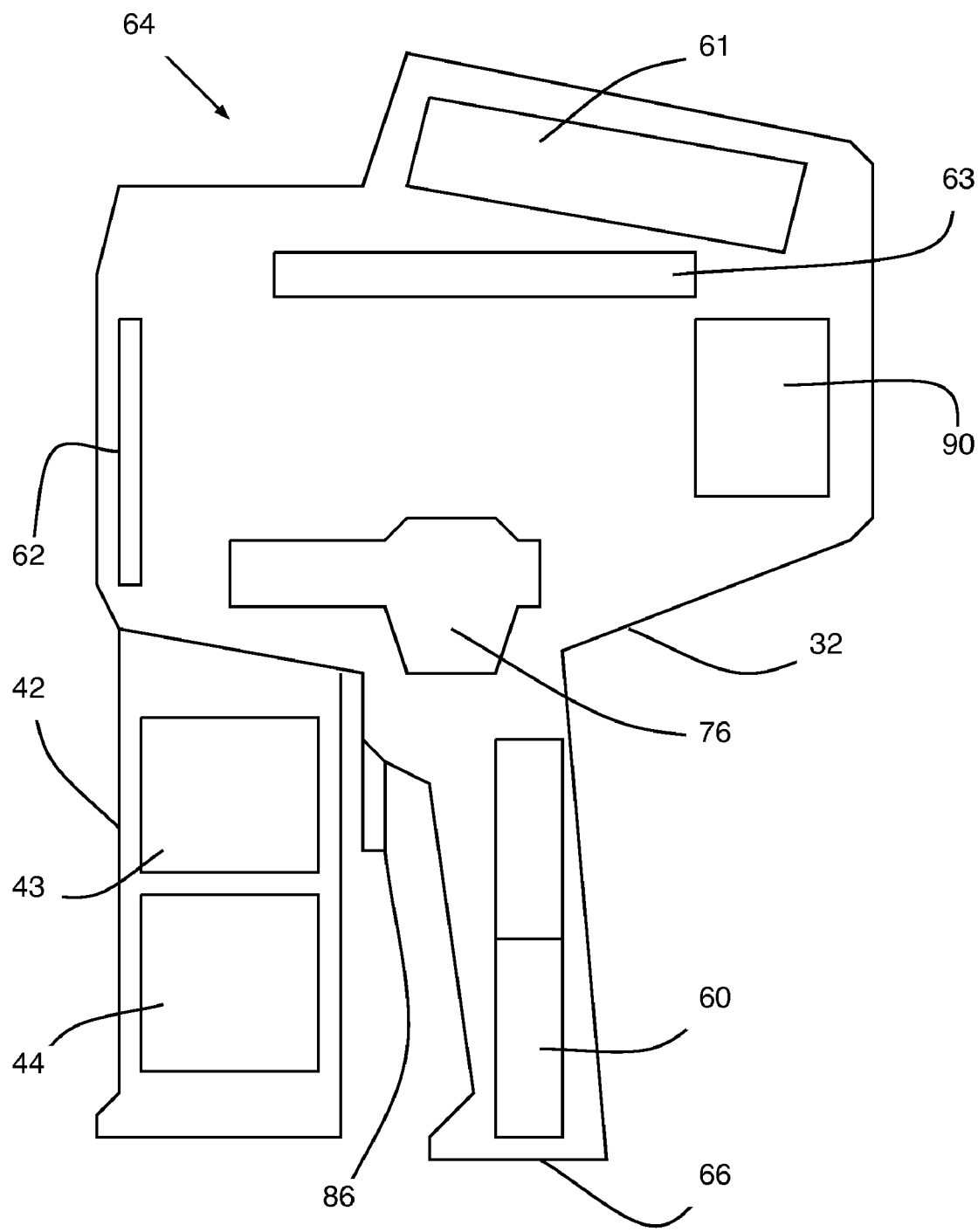
FIG. 8 is a schematic cross section of an encoder according to the present invention.

In one embodiment, shown as a cross-sectional schematic in FIG. 8, a contact image sensor (CIS) 90 or a linear optical array is used to scan along the length of an RFID transponder before it is applied to a container. CIS 90 produces a video stream that is decoded and then interpreted and stored by an on-board Computer 61. CIS or a similar linear array sensor is capable of reading both linear and two-dimensional bar codes. In certain embodiments, CIS reads two-dimensional bar codes before attachment to inlay or transponder. The on-board computer creates a logical association between bar codes and the commissioned RFID transponder. Encoder 64 reads and associates all bar code symbols on a single segment with the RFID transponder or inlay adhered to it.

When an operator pulls the trigger 86, which is either a mechanical trigger or an electro-mechanical device, the on-demand commissioning of the RFID transponder occurs and nearly simultaneously is pressed against a container within a fraction of a second. In certain embodiments, mechanisms internal to encoder 64 transfer mechanical force to the RFID transponder tag through the use of air, springs, motors, plungers, elastomers, or other energy storing or delivering methods. Reloading of the next tag (next transponder) and readying of the system are performed within a time interval that is acceptable to the operator and enables a high degree of productivity for tagging cartons, pallets, or other transport containers.

In certain embodiments of a combined interrogator/application, a trigger 86 couples to an electrical switch having one or more stable positions that are detectable by a controller. In certain modes of operation trigger-switch state is coupled with range information from a sensor suite 218 to execute functions at predetermined ranges at predetermined times. The result is a trigger that functions based upon detected range from a container or other object of interest. This advantageously improves operator efficiency and productivity as one trigger executes several different functions that are typically involved with RFID tagging including the tagging of bar-coded cartons that have been selected to receive wireless sensors.

Verification of bar code occurs either before or after an RFID transponder is commissioned and the tag applied to the container by merely stepping back to a point where the sweep angle of a laser beam or field of view of an imager can read a bar code label. In certain embodiments ranges shorter than that, but not in Close Proximity, are used for sweeping a radio frequency interrogation signal across the faces of multiple cartons to assure that the correct tags, the correct number of transponders, and the correct data within that transponders were all properly programmed.

In certain embodiments Close Proximity range is reserved exclusively for programming, applying, and verifying one transponder, all in a single pull of trigger. In other embodiments, the interrogator includes programmable conditions that enable Trigger Events to interact with external devices or nearby equipment. For example, at a predetermined range from the interrogator, activation of the trigger causes the encoder to transmit a coded signal to an external device as an indication of an operator action: at a Far-range the signal to requests an external device to read a bar code and the bar code information is decoded and transmitted back to encoder. In another embodiment, decoded barcode information is processed by a portable data terminal (PDT), a vehicle mount terminal, or other computing device.

The on-board computer 61 controls the operation of the RFID Interrogator Module 63 to read, write, and verify RFID tags, inlays, transponders, and wireless sensors that are applied or are within range of the interrogation fields produced by antenna 62. The encoder 30, capable of reading multiple RFID transponders near it can, in certain embodiments, produce a linearly polarized radio field via the internal antenna 62. In another embodiment, the internal antenna produces a horizontally polarized RF field. A commissioned transponder can be read both before and after it is applied to a transport container. When multiple transponders are within the interrogation field of the encoder 30 with an interrogator module 63 the on-board computer 61 determines which transponders are commissioned and dispensed versus those transponder that have not. In certain embodiments, the on-board computer maintains records of transponders recently applied in order to properly determine how to interact with each transponder in the field of the internal antenna or other antennae under the control of RFID Interrogator.

In one possible embodiment, the interrogator/encoder utilizes preprinted information on a set of RFID transponders. The pre-printed information includes one or more logos, an EPC-global Seal, and other informative alpha-numeric or bar-code data. Certain preferred embodiments of encoder/applicators 30, 64, and 210 correlate RFID tag data with data encoded in certain preferred bar codes. In certain preferred embodiments, applicators such as applicator 30 read the bar code preferably using a sensor such as CIS 90 as the tape is unrolled from a spool. In certain other preferred embodiments, an RFID tag is located on cartridge 42 and contains a numerical value that is directly or indirectly representative of the numerical values optically encoded into the bar codes preferably at least indicating the starting numerical values of a number sequence. Other additional information is also encoded in the RFID tag in certain preferred embodiments, including the number of tag positions, the number of good tags, the ending sequence number, the date, time and place of tag conversion or other preferred commercial, logistic, or manufacturing information. In certain preferred embodiments of applicators 30, 64, or 210 certain wireless tags attached to cartridge 42 are capable of being read. In certain preferred embodiments the interrogator such as interrogator 63 is capable of reading an RFID tag mounted to the loaded cartridge, and is also preferably capable of filtering out its response to interrogation or programming of RFID tags.

Certain embodiments have a motorized tape drive and dispensing system. Certain embodiments contain some or all of the following: a rechargeable battery, an operator display, a wireless interface, a network stack, an IP address, a PCMCIA port, a Compact Flash port, a USB cable, a serial cable, a dock port, a window to allow the operator to view the transponder attachment process, or a bar code scanner.

One suitable interrogator includes model MP9311 available from Sirit Technologies of 1321 Valwood Parkway, Suite 620 Carrollton, Tex. 75006, USA. Other RFID transponder or wireless sensor interrogator modules with other feature sets are also possible for use in the interrogator/encoder.

FIGS. 8 and 9 show one possible interrogator/encoder 64 according to the present invention. The interrogator/encoder 64 comprises a housing 65 having a user input device 67, such as a key pad or key board, and a user output device, such as an LCD screen 68, for displaying optically scanned label data, RF interrogated data from a transponder, and other information including on-board diagnostic functions, bios status, and external information provided from a remote computer as sent over a wireless network, for example. A handle structure 66 enables point-of-use deployment while cartridge 42 enables on-demand commissioning of RFID transponders, which are dispensed from the transponder port 46. In this embodiment, an integrated YAGI antenna 62 creates a large forward-looking main lobe of radio frequency energy for interrogation of commissioned RFID transponders. The internal antenna also produces side lobes of RF energy that although attenuated from the main lobe by several dB, couple enough power into nearby readied transponder to interrogate and write to it.

As further depicted in FIG. 10, a reflector 219b passively reflects RF signals from an upper side lobe downward toward readied tag 216f. Backscatter from tag 216f propagates to both antenna 219a and reflector 219b for processing by the interrogator. Having such an antenna embedded in PDT 219 and mounted to the structure of the encoder housing enables the PDT 219 to encode and verify readied transponder 216f while commanding the encoder to commission and dispense a tag when a particular Trigger Event or a predetermined range status change occurs.

An antenna, or alternatively, leaky coax 212a or a near-field coupler is located outside of protective enclosure of cartridge 42 in a location very close to the tag attachment zone in front of a tamp head or tag application roller and holding rollers 216d or hammer 216a.

In some embodiments antenna 212b is a patch antenna with a radiation pattern toward the tag attachment zone. In other embodiments the antenna is a near field coupler. Alternatively, leaky coax, a type of coaxial cable having slits, slots, or perforations that allow radio frequencies to leak in or out, is used in encoders according to the present invention. A coupled-mode cable, which does not radiate as well as radiating-mode cable, is constructed with closely spaced slots in a corrugated outer conductor. Radiating-mode cable typically has a foil outer conductor with non-uniformly spaced slots arranged in a periodic pattern. Coupled-mode cable is a slow-wave structure. In free space its external fields are closely bound to the cable and do not radiate, except for minor end effects according to "Prediction of Indoor Wireless Coverage by Leaky Coaxial Cable Using Ray Tracing" by Samuel P. Morgan of Bell Laboratories, Lucent Technologies.

In certain embodiments an interrogator drives a signal into a leaky coax that is terminated in a purely resistive load of about 50 ohms. An RF-switch selects between radiating and non-radiating loads including an antenna or leaky coax and, therefore, avoids mismatched load impedance.

In other embodiments internal antenna 212b or 212c is a patch antenna with its strongest lobes oriented toward the tag holding and placement area in the region of holding rollers 216d. Antenna 212c or leaky coax 212a work with an interrogator to produce electromagnetic fields to interrogate, program, and verify wireless sensors. Shield 217e prevents interrogation or programming of RFID transponders until they arrive at separation roller or tag peel edge 217d. A reflector is used in certain embodiments to reflect RF radiation toward a readied transponder. In the event that verification fails, the operator is informed that the bad tag (or inoperable transponder) is to be discharged onto a surface of a third object other than the encoder or the transport container, for post-mortem analysis.

Referring to FIG. 10 drive motor 76 is preferably located inside the center of source reel 43 within the circular walls of applicator housing 211b, around which cartridge 42 is nested when mated to interrogator/encoder/applicator 210.

Motor 76 is mounted to the structural frame of applicator 210 and preferably transfers mechanical power to certain drive points preferably using gears, belts, or drive shafts within applicator housing 201a or 211a. In certain preferred embodiments of applicator 210 certain preferred drive points include take-up reel 44, source reel 43, or hammer arm 216a.

Trigger 86, preferably embedded within trigger handle 66 is actuated by an operator, preferably causing a Trigger Event. In certain preferred embodiments, there is more than one kind of Trigger Event. In certain preferred embodiments of applicator 210 certain types of either mechanical or electromechanical actuators are preferably used to cause hammer mechanism 216a to trip, being driven toward readied tag 216f, through port 46 for placement on a transport container at the face of bulkhead 211a.

Another means of electromechanical actuation from a Trigger Event initiated by sensor suite 218 is illustrated in FIG. 10 whereby DC motor 215c runs in a reverse direction causing ratchet 216b to become disengaged, allowing hammer 216a to accelerate toward tag 216f due to the torque exerted by spring 216c. Hammer 216a passes between holding rollers 216d to press tag 216f against the face of a transport container.

Interrogator 212d is preferably capable of working with controller 213b to recognize which tags have been recently programmed or applied so as to filter out their response to interrogations of other tags, especially those tags that are being prepared for attachment. Interrogator 212d is preferably capable of modulating its transmitted radio power to affect the range and signal to noise ratio of its coupling to wireless tags.

E. Method of Inlay Conversion

FIG. 11 shows one method according to the present invention and includes preparing a carrier substrate (Block 111) for use in an RFID transponder or in a wireless sensor that includes both an RFID transponder and sensor device. This process contemplates utilizing adhesive-backed packing tape or some similar material suitable for adhering a commissioned RFID transponder to a container or other object of interest. Certain embodiments for this step include machines to cut large rolls of mesh or net into numerous small rolls with the desired width, length, and core diameter. For example, a supply-roll of stock mesh or net measures about 14-feet wide and about 5000-feet long, rolled onto a core. In one embodiment the supply-roll must be trimmed to fit the width suitable for use in a mobile encoder 30 or similar encoder/interrogator as described in this disclosure.

For certain embodiments, the carrier substrate width is about the length of a simple UHF dipole inlay, as shown, for example, in FIG. 1. In one embodiment the carrier substrate width measures about 4-inches. The length of the carrier substrate depends on many factors including the target cost per transponder of the cartridge and all of its components. Other factors that determine the length of the carrier substrate include the target size and weight of the cartridge and/or the mobile encoder. A possible machine that converts large supply-rolls into smaller ones, in one embodiment, consists of a stand-alone industrial machine. However, in other embodiments, the trimming function is part of an integrated machine.

Block 112 represents the testing process of an RFID inlay comprising, at least, an RFID chip and antenna device. The testing, or interrogation, of the inlay, in one embodiment, includes an interrogator and an antenna or a near field coupler, which read the inlay. This process further includes monitoring various parameters such as activation energy, backscatter signal strength, sensor performance, and other indicators of the quality of the RFID transponder or wireless sensor. Any transponder or tag that does not meet certain minimum performance criteria is discarded. Good transponder or tags are subsequently programmed, encoded, or commissioned with new information relating to the associated object of interest. Such information resides or stores in non-volatile memory within the RFID inlay. Inlays that fail to perform to adequate levels of performance are immediately separated from the process.

Block 113 represents a third process step consisting of applying and encapsulating good inlays in an encapsulation layer or encapsulation zone of the RFID transponder. One possible encapsulation layer comprises a packing tape constructed from pressure sensitive acrylic adhesive and backed by a substrate layer of bi-axially oriented polypropylene film. In certain configurations such packing tapes provide up to about 25,000 volts of ESD resistance when properly applied in about 0.002-inch thick layers of encapsulation. Other packing tapes, available in thicknesses of about 0.001-inches, when combined in layers provide higher ESD voltage resistance ratings. The inlay substrate contributes additional ESD resistance in certain contemplated configurations.

Block 114 represents another process step consisting of applying the converted RFID transponder to an interposing transport media. Such media preserves the tackiness of the exposed adhesive. One possible adhesive includes a pressure-sensitive adhesive, which adheres to most surfaces with very slight pressure and retains tackiness above their melting point of about negative-65 (−65) to about negative-90 (−90) degrees centigrade. In another embodiment, silicone-based release liner is used to transport and preserve pressure sensitive adhesive tags and labels. In other embodiments, the transport media includes utilizing air pockets bounded by regions having tensile strength such as fibers: for example, plastic or metal fibers. Certain plastic resins have a low surface energy and prevent strong adhesive bonds from forming and are bound together to form a mesh or net. Mesh (or net) constructions offer a means of handling converted tags without allowing a substantial percentage of the available adhesive to make contact with any other solids until the tag is commissioned.

Block 115 represents another process step consisting of winding converted transponders onto a spool with the interposing transport media. The core diameter, number of transponders, layer thickness, the thickness of any dielectric foam spacer layer, and outer diameter are all optimized for efficient, economical, and convenient deployment in transponder commissioning processes disclosed herein. Finished spools are packaged in a manner to prevent ESD damage. Certain enclosures include anti-static bags, foil-lined cartons, metal plated cartridges, and carbon-impregnated plastic enclosures. Certain enclosures are reusable. Certain enclosures of application-ready rolls or Z-folded transponders having low energy interposing transport media mate directly with encoders as described in this disclosure.

F. Method of Tagging Containers

FIG. 12 is a block diagram representing a second method according to the present invention including applying RFID transponders to objects of interest. One suitable object of interest comprises transport containers such as corrugated cartons or shrink-wrapped cases on a shipping pallet, which is inadequately addressed by the prior-art, particularly for solutions for manually operated automatic encoding and attachment to a container.

Block 121 represents a process step including the identification and selection of a container to be tagged with an RFID transponder or wireless sensor. In one embodiment this step includes a manual selection and verification processes that consists of manual handling, visual sighting, and scanning bar codes with a hand-held optical reader device. This method contemplates that a transponder encoding scheme is ready in advance and synchronized with a pick list, customer purchase order, advanced shipping notice, and other such records to assure that goods are properly moved and accounted for.

Block 122 represents another process step of identifying the information to be encoded, and may be included in the step represented by Block 121. In this step (Block 122), an operator uses a bar code reader or an encoder/interrogator of this disclosure. Alternatively, the operator may receive instructions delivered to a hand-held PDT or other mobile data terminal connected to a wireless network. This information is delivered to an encoder, such as encoder 30.

Block 123 represents another process step whereby, using a mobile encoder, the operator then commissions an RFID transponder with the information of the previous step (Block 122). Optionally, successful commissioning of the RFID transponder is verified by the encoder. In one embodiment, the encoder tests the next transponder and determines if it is operating within certain predefined specifications including parameters such as activation energy, backscatter signal strength, sensor performance, and other indications of the quality of the transponder. If the encoder determines that the transponder is not likely to result in a successful transponder deployment due to either physical or electronic deficiencies or abnormalities, then the operator is informed and the failed or bad transponder is discarded automatically or when an operator pulls a trigger under an operator-acknowledged transponder failure condition.

This step (Block 123) also includes processes to read or determine by dead reckoning the information encoded into certain preprinted optically encoded symbols on the outward facing non-adhesive surface of the adhesive tape. In certain embodiments the adhesive tape is printed with information. In other embodiments the printed information is a machine-readable symbol such as a bar-code symbol. For example, one or more machine-readable symbols are read when the tape is prepared for use in an automated encoder or, alternatively, during the inlay conversion process and conveyed to an encoder through other data storage means, such as an RFID transponder. In one embodiment, an information encoding method uses either one-dimensional or two-dimensional bar codes. In some embodiments a linear imager is used to read either linear or two-dimensional bar codes as the tape is being unrolled from a spool. Some encoding schemes preprint machine-readable symbols at regular intervals along the length of a roll of adhesive tape. In certain embodiments the spacing of the preprinted symbols is at an interval of one half of the nominal length of each section of adhesive tape. In certain embodiments, the encoded information is used as a reference to one or more data storage locations. In other embodiments the data storage locations are accessible through a computer network. In some embodiments, the encoded information is a series of sequential numbers. Information relating to data stored in the RFID transponder is stored in data storage locations that are referenced by one or more of the preprinted symbols. In an alternative embodiment more than one type of machine-readable symbols can be read from the surface of a segment of tape. In certain embodiments, more than one machine-readable symbol is used as a reference to the same or closely related data records of information stored in the RFID transponder or inlay, and either can be successfully used to access stored data.

In some encoders used in this step (Block 123) a Trigger Event occurs, which results in the verification that a particular commissioned RFID transponder has been tagged and associated with a specific container. This Trigger Event occurs, in certain embodiments, when an operator pulls a trigger on the encoder. In other embodiments the Trigger Event occurs when certain sensors detect preprogrammed conditions relating to the proximity of the encoder face to an object that is to be tagged.

Finally, (Block 124) the operator applies the RFID transponder on the container and, thus, commissions the transponder. In certain embodiments, the location of the targeted placement of the RFID transponder or wireless sensor on the container is stored in a database, which is referenced or pointed to by information that is stored in the memory of the encoder. In one embodiment, the operator holds the encoder against the face of the container based on the tagging requirements for that particular container. The tagging requirements including the location and orientation of the RFID transponder to be placed is conveyed visually or aurally. For example, the operator receives visual information via a screen or display on the encoder. In certain embodiments, physical indicators are attached to the encoder and extend from its body in a direction and manner so as to assist the operator in the positioning of the transponder onto the carton. In other embodiments, transponders are applied to the interior of a carton, before it is sealed.

G. Method of Commissioning RFID Transponders Using a Mobile Applicator.

Figure 13:
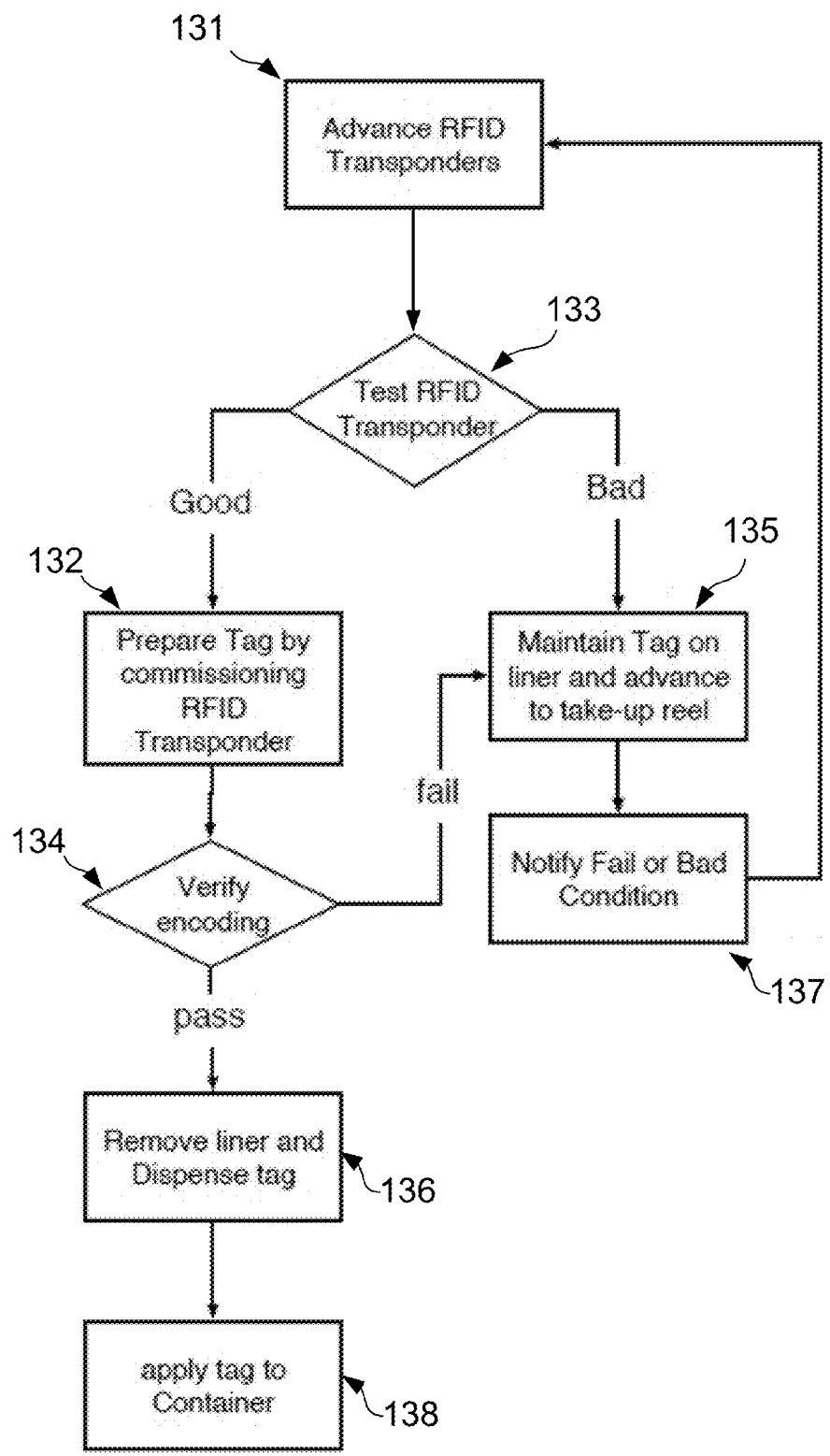
FIG. 13 is a flow chart of a third method according to the present invention.

FIG. 13 is a block diagram showing a method according to the present invention for commissioning RFID transponders using an encoder, such as the encoder 30, couples to a cartridge or protective enclosure containing a plurality of RFID transporters releaseably mounted on a transport sheet or roll. The encoder enables the roll of RFID transponders to advance one position (Block 131), placing the Next Tag in a test 1 position. The Next Tag is tested (Block 133) to ensure that it performs within predetermined parameters such as activation energy, backscatter signal strength, sensor performance, and other indications of the quality of the transponder. One possible method includes encoding a transponder using only a minimal amount of radio-frequency energy. Since transponder encoding requires more energy than reading a transponder, this low power test constitutes a basic test of both minimal activation energy and backscatter signal strength.

An RFID transponder that fails this test (Block 133) results in a "Bad Tag" status and proceeds to the take-up reel of the encoder (Block 135). Thus, any failed transponder remains captive in the cartridge and cannot be released from the encoder by an operator. Optionally, the operator is notified of the failed transponder so the operator can request a newly encoded transponder (Block 137). However, in one embodiment, the notification step occurs automatically, and a newly encoded next transponder is generated without input from the operator.

Block 132 shows that a "good" transponder is positioned in the encoder for the encoding process. The RFID transponder that passes the test 1 position is commissioned with predetermined data based on the container to be tagged. Methods of obtaining, storing, encoding, and commissioning this information on the RFID transponder are discussed elsewhere in this disclosure.

The commissioned transponder undergoes a verification process (Block 134) to determine if the intended information was successfully encoded on the RFID transponder. Certain embodiments combine the verification step with the encoding step to gain operational efficiencies. If this verification test results in a fail condition, the transponder remains in the encoder and ultimately winds on the take-up reel in the cartridge for subsequent post-mortem failure analysis.

Block 136 represents a pass condition. The encoder removes the commissioned RFID transponder from the transport web or release liner, enabling the operator to retrieve the transponder from the encoder and apply the transponder to the container. In an alternative embodiment, the operator or a fixture holds the encoder against a surface of the container and the encoder places the commissioned RFID transponder directly on the container without operator intervention.

H. Method of Providing RFID Transponders to an Encoder.

Figure 14:
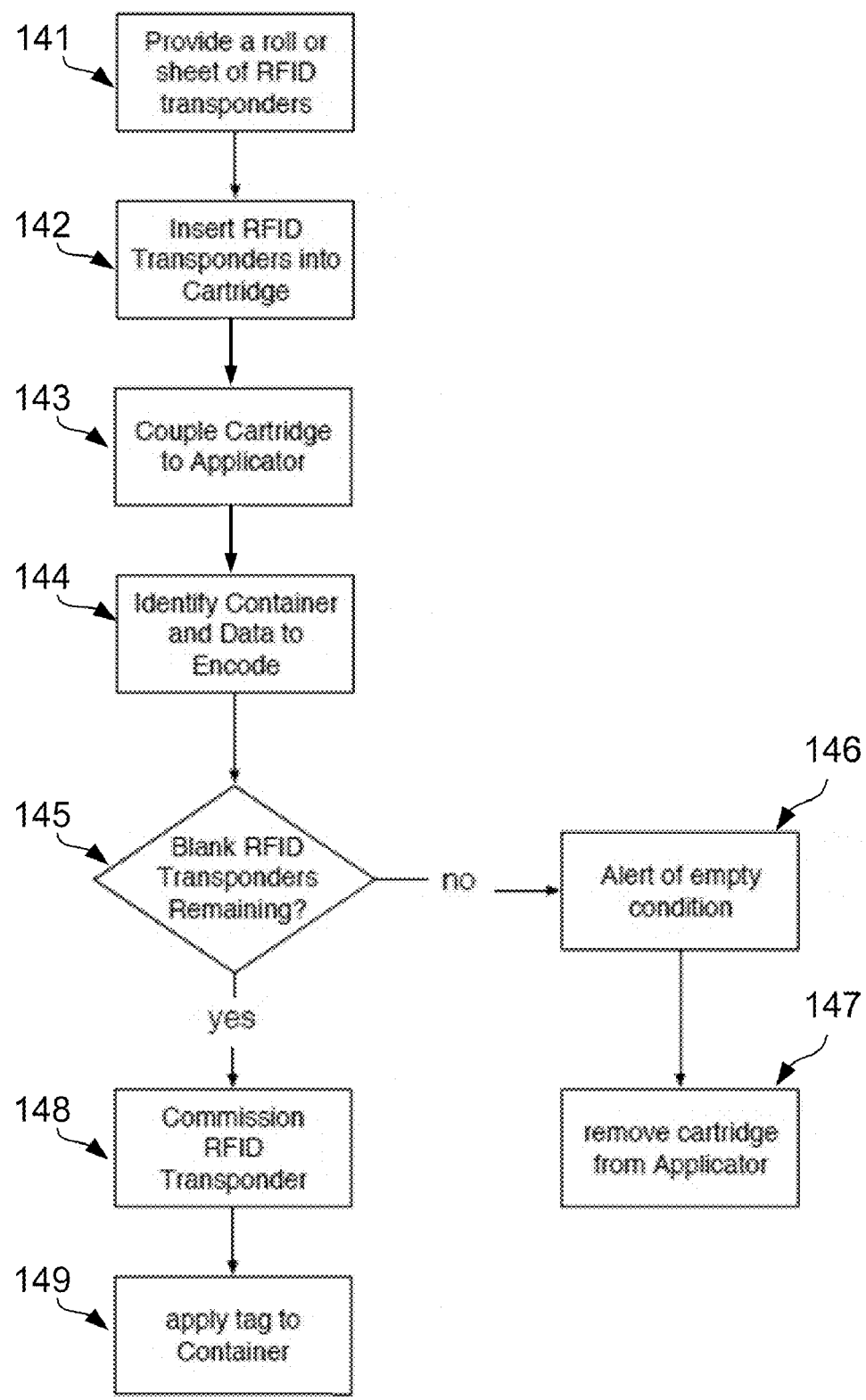
FIG. 14 is a flow chart of a fourth method according to the present invention.

FIG. 14 is a block diagram showing another method according to the present invention. One step, represented by Block 141, includes providing suitable RFID transponders such as the transponder 50 of FIG. 2, which are presented on a sheet or roll, such as sheet 59 of FIG. 4.

Figure 5:
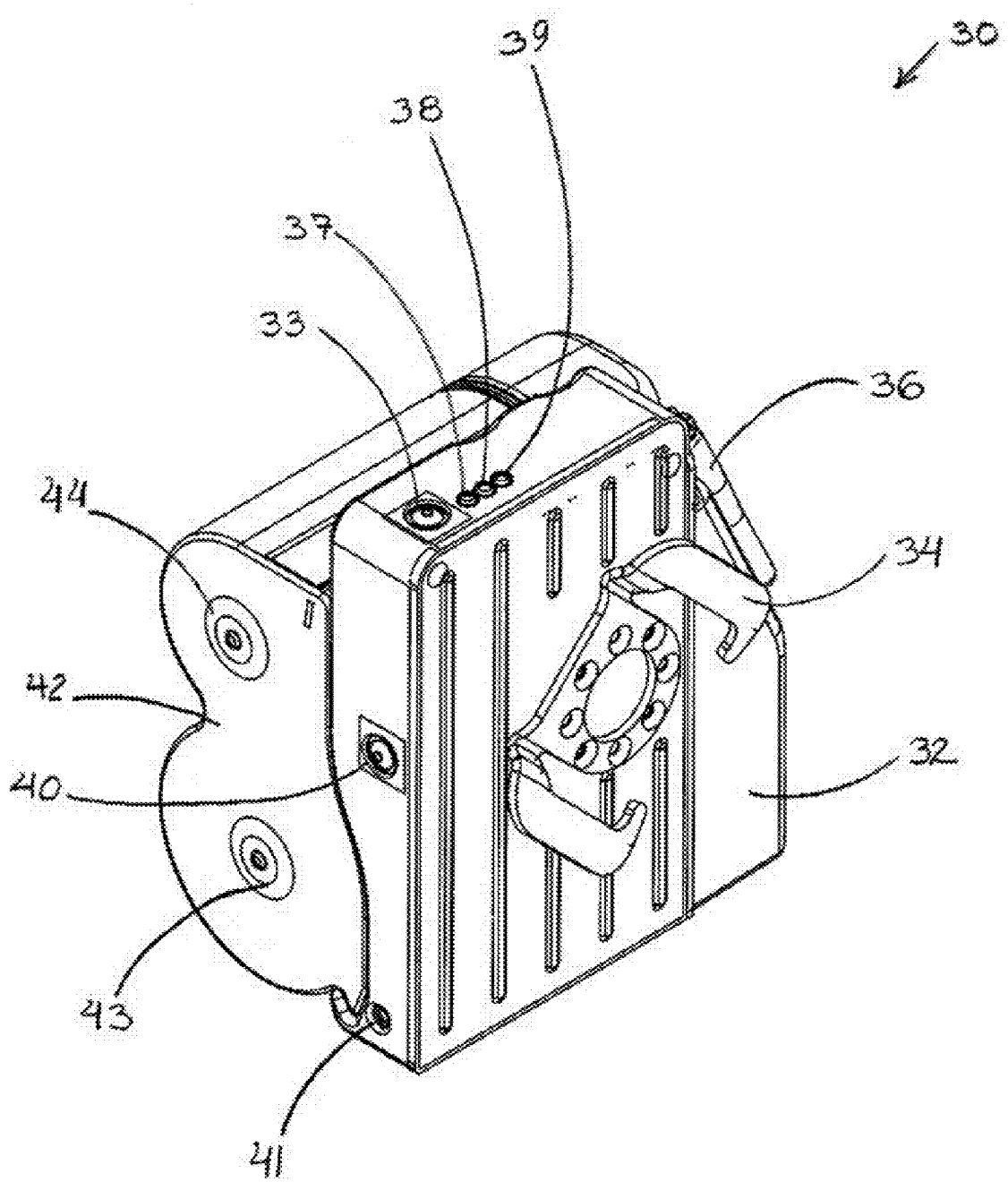
FIG. 5 is an offset orthogonal view of a mobile encoder according to one embodiment of the present invention.

Block 142 shows the process step of inserting the roll of RFID transponders into a cartridge of an encoder such as cartridge 42 of FIG. 5. Steps 141 and 142 are ideally suited for off-site repairs and replacements of cartridges. Accordingly, a customer may send a used cartridge to a repair facility, enabling the cartridge to be recycled.

At a point-of-use location, such as a customer's warehouse or packaging facility, a fresh cartridge full of blank, or non-commissioned, RFID transponders attaches to an encoder adapted for such use (Block 143) and is used normally (Block 144), as previously described herein, to identify containers and data to encode on an RFID transponder. Prior to encoding, (Block 145) the encoder verifies that a non-commissioned transponder remains in the cartridge. If such a transponder is available (Block 148) the RFID transponder is commissioned and in certain embodiments applied to the container (Block 149) by means previously disclosed herein. If the cartridge is empty (Block 146), the operator is alerted by various known means described herein or otherwise known by those skilled in the art. And, the cartridge is removed (Block 147). The removed cartridge is sent to another location, a recycling, re-use, repair, or re-building center that is either on or off-site, or is discarded.

I. Method for Recycling Used Cartridges of RFID Transponders.

Figure 15:
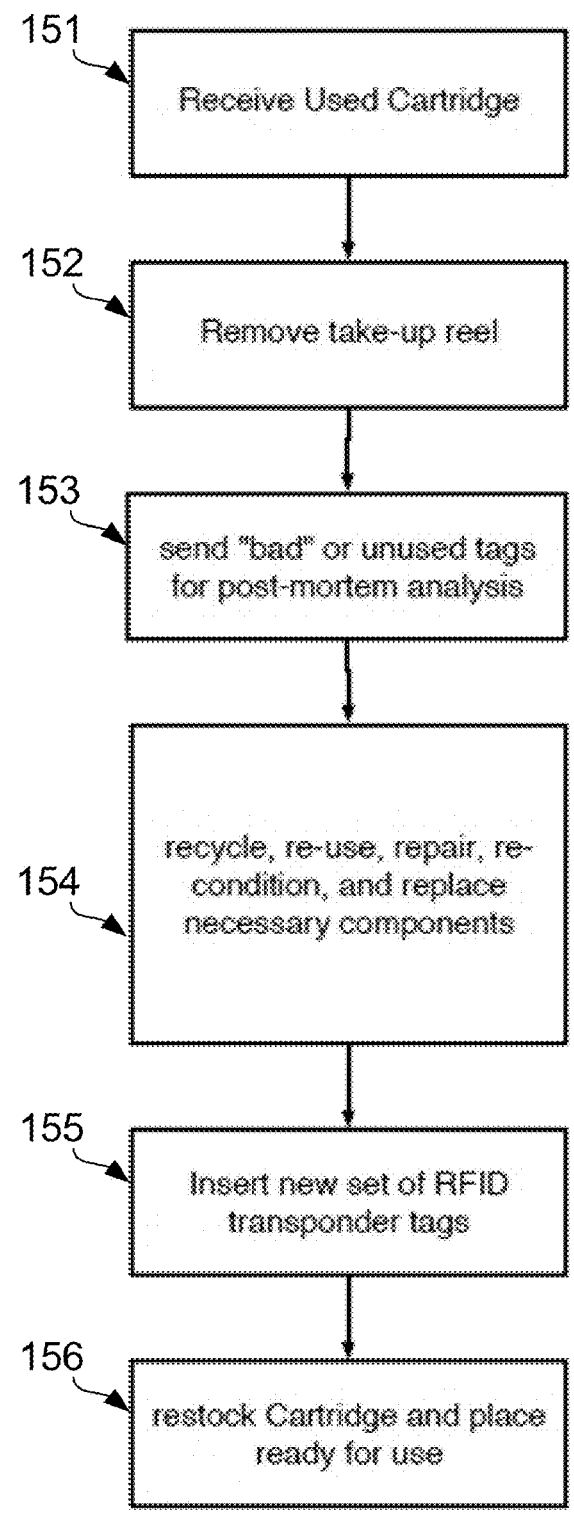
FIG. 15 is a flow chart of a fifth method according to the present invention.

FIG. 15, a block diagram, shows a method for recycling cartridges from, for example, a process similar to the one shown in FIG. 14. A repair center receives the used cartridge (Block 151). In one embodiment, the repair center is off-site from the customer, and allows specialized repair, reconditioning, re-use, recycling, and replenishment to provide cost-effective and environmentally sensible replacement cartridges.

In certain embodiments, a protective enclosure and RFID transponder recycling center reduces the amount of waste associated with enabling the convenience of tagging and safely handling RFID transponders and devices such as encoders or interrogators. For example, plastics and silicone are non-biodegradable materials that are suitable for recovery, re-use, and recycling. Certain plastic parts are disassembled, hub-cores are recycled for paper waste, and silicon-coated release liner is accumulated and separated from the recyclable (re-pulpable) paper for proper handling, recovery, and disposal—if needed. In such an embodiment, a customer sends the spent protective enclosure, such as the cartridge 42, to an off-site recycling facility. The spent cartridge is replaced by either a new (virgin) cartridge or a refurbished cartridge, as appropriate and such replacement cartridge is replenished with blank RFID transponders.

Recycling continues with the RFID transponders as well. In certain embodiments, the RFID transponder 50 is configured and adapted for re-use. Accordingly, the data is wiped and re-coded as appropriate. In other embodiments portions of the RFID transponder are recycled. For example, the aluminum antenna separates from the encapsulation layer and is recycled. The paper stock is recovered and re-pulped.

In certain embodiments, replenishment of empty cartridges or magazines is performed as a service at a customer's site such as a warehouse, distribution center, packing plant, 3PL logistics center, or a manufacturing plant.

Figure 16:
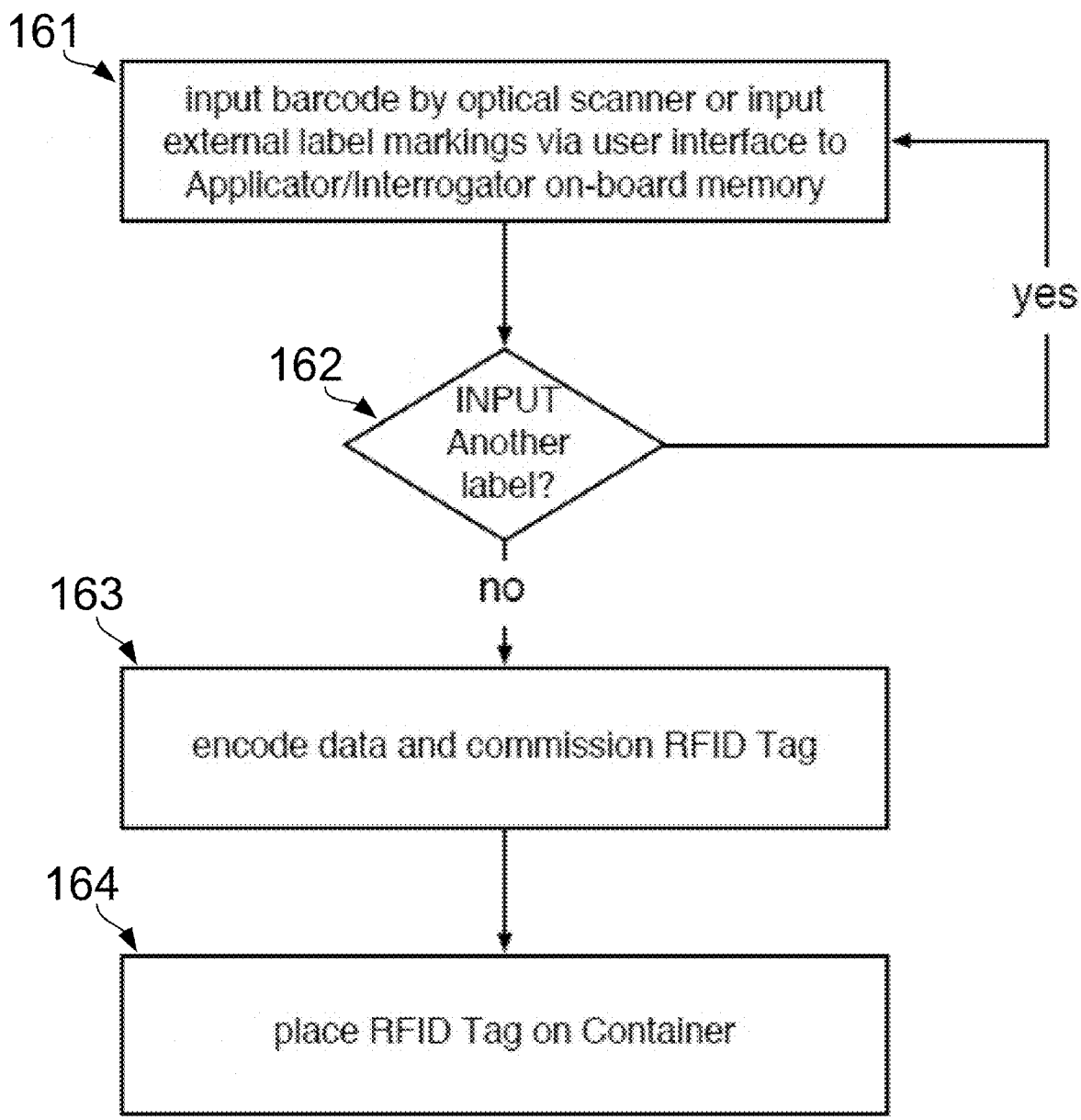
FIG. 16 is a flow chart of a sixth method according to the present invention.

FIG. 16, a block diagram, shows another method according to the present invention and consists of an algorithm for determining when an RFID transponder is commissioned based on predetermined criteria. For example, a shipping container typically includes a mixed lot of products. Accordingly, several different product-identifying barcodes are serially scanned (Block 161) until an end of condition event occurs (Block 162). This end of condition event may be queried after each scan or provided to an interrogator/encoder based on a supplied heuristic (i.e. volume, weight, etc.), pack list, or other customer-driven data.

Once all data is compiled and stored on the encoder, an RFID transponder is commissioned and encoded with the data or a logical pointer to a storage location of the data (Block 163). Then, it is applied to the container (Block 164) by means discussed previously herein.

While the invention has been particularly shown and described with reference to certain embodiments, it will be understood by those skilled in the art that various changes in form and detail may be made without departing from the spirit and scope of the invention.

I claim:

1. An encoder for commissioning RFID transponders, the encoder comprising:
    an RFID interrogator module adapted to enable encoding predetermined data according to a commissioning algorithm and communicating with an internal antenna or near field coupler, the antenna or near field coupler being adapted to encode the predetermined data on the RFID transponder;
    a memory storage device for storing at least a portion of the predetermined data;
    a processing means for controlling and communicating with the memory storage device, the RFID interrogator module and the internal antenna or near field coupler;
    a release liner means to carry RFID transponders;
    a means for providing a supply of RFID transponders, the transponders configured for tensile extraction from the encoder;
    a take-up reel means to collect the release liner means and RFID transponders deemed defective by a fail condition indicated by the RFID Interrogator module; and
    a means for presenting the RFID transponder within an operable range of the internal antenna or near field coupler to enable encoding of the predetermined data.

2. The encoder of claim 1 further comprising a wireless communication means for wirelessly receiving at least a portion of the predetermined data or the commissioning algorithm, or both.

3. The encoder of claim 1 further comprising an external housing adapted to enclose the internal antenna and further being adapted to receive a protective enclosure, the protective enclosure being adapted to enable tensile extraction of the RFID transponders.

4. The encoder of claim 3 wherein the wireless communication means further comprises an external antenna mounted to the housing.

5. The encoder of claim 1 wherein the means for presenting the RFID transponder comprises a motor assembly adapted to pull the RFID transponder from a supply reel.

6. The encoder of claim 5 wherein the supply reel rotatably mounts inside a protective enclosure, the protective enclosure adapted to releasably couple to the encoder, the protective enclosure further comprising the take-up reel means wherein both the supply reel and the take-up reel means include a drive mechanism that selectively engages the motor assembly.

7. The encoder of claim 5 further comprising a power supply module controlled by the processing means and coupled to the motor assembly.

8. The encoder of claim 7 wherein the power supply module comprises a rechargeable battery.

9. The encoder of claim 1 further comprising a housing assembly for enclosing the internal antenna and a handle-device mounted on a bottom surface of the housing.

10. The encoder of claim 1 further comprising a housing assembly for enclosing the internal antenna and a belt-clip attachment mechanism mounted on a side surface of the housing.

11. The encoder of claim 1 further comprising a housing assembly for enclosing the internal antenna and a mounting mechanism for selectively coupling the encoder to a provided structure.

12. The encoder of claim 1 further comprising means for reading a commissioned RFID transponder.

13. The encoder of claim 12 wherein the means for reading a commissioned RFID transponder comprises the internal antenna.

14. The encoder of claim 1 wherein the commissioning algorithm further comprises an encryption subroutine.

15. The encoder of claim 1 further comprising a user-input device comprising at least one switch coupled to the processing means whereby activation of the switch enables a predetermined first function to execute.

16. The encoder of claim 1 further comprising a user-output device comprising a LCD panel coupled to the processing means and adapted to display a user first-information set.

17. The encoder of claim 1 further comprising an optical reader adapted to read barcodes and transmit data to the processing means.

18. The encoder of claim 1 further comprising dispensing means for verifying that the RFID transponder was encoded and for dispensing an encoded RFID transponder and for not dispensing an un-encoded RFID transponder.

19. The encoder of claim 18 wherein the dispensing means further comprises a transponder peel-device for removing the encoded RFID transponder from the release liner means and a transport liner collection mechanism for spooling the release liner means onto the take-up reel means.

20. The encoder of claim 1 further comprising means to cryptographically generate and encode passwords into RFID transponders.

21. The encoder of claim 1 further comprising means to place the encoded transponder directly onto a container without operator intervention.

22. A system for enabling on-demand, point-of use commissioning of RFID transponders to uniquely identify an object, the system comprising:
- an RFID transponder comprising a self-adhesive layer adapted to adhere the transponder to the object, a release liner releasably coupled to the self adhesive layer, the RFID transponder having an antenna device, the antenna device adapted to wirelessly send and receive data packets corresponding to an information set;
- an RFID transponder encoder device having processing means and memory means, the encoder device being adapted to receive at least one RFID transponder from a first dispensing means, the encoder device further including commissioning means for commissioning the at least one RFID transponder, means for verifying the status of a commissioned transponder, means for selectively removing the release liner and for dispensing the commissioned transponder, and means for selectively capturing an un-dispensed transponder;
- an RFID transponder encoding algorithm;
- a means for coupling to the commissioning means a protective enclosure adapted to contain a supply of the RFID transponders, the transponders being further adapted for tensile extraction from the protective enclosure; and
- a remote computer system adapted to wirelessly communicate with the transponder encoder and adapted to selectively enable the encoder to commission the transponder with data encoded according to the encoding algorithm.

23. The system of claim 22 further comprising an interrogator device adapted to wirelessly read the data set encoded on the RFID transponder.

24. The system of claim 22 further comprising an interrogator device adapted to wirelessly encode a new data set on the RFID transponder.

25. An RFID transponder adapted for use in an RFID encoder, the RFID transponder comprising:
- a transport liner substrate layer adapted to peel away from a pressure-sensitive adhesive layer when sufficient tension is provided around a peel-device to enable extraction from a protective enclosure of the RFID transponder only if the RFID transponder is successfully encoded with product identifying data by the RFID encoder; and
- an RFID inlay comprising an antenna structure coupled to an RFID chip, the RFID inlay coupled to the adhesive layer.

26. The RFID transponder of claim 25 further comprising a visual-marking layer for enabling machine or human visual recognition of a bar code or other visual marking scheme.

27. The RFID transponder of claim 25 further comprising at least one password encoded into the RFID chip that is cryptographically generated by the encoder from data stored in the RFID chip.

28. A method for tagging a container comprising:
- providing an encoder having at least one RFID transponder;
- identifying information to be encoded on the RFID transponder;
- commissioning the RFID transponder by encoding the information;
- associating the RFID transponder with the container; and
- presenting the RFID transponder for attachment to the container by pulling a conveyance web or a release liner with the transponder attached thereto around a peel-device to extract transponders from a protective enclosure.

29. A method for commissioning RFID transponders comprising:
- providing an RFID transponder encoder having a peel-device;
- providing information to the encoder;
- providing a protective enclosure containing at least one of the RFID transponders;
- mounting the RFID transponder to a conveyance web or release liner;
- coupling the protective enclosure to the encoder;
- advancing the RFID transponder in the encoder; and
- encoding the information on the transponder.

30. The method of claim 29 further comprising:
verifying that the information was encoded to the transponder.

31. The method of claim 30 further comprising:
dispensing the RFID transponder if the information was properly encoded.

32. The method of claim 29 further comprising:
storing the RFID transponder if the information was not properly encoded.

33. The method of claim 29 further comprising:
providing the encoder with a motor adapted to provide tension in the conveyance web or release liner in a direction along its major axis.

34. The method of claim 29 further comprising:
encoding a password into the RFID transponder.

35. A method for commissioning RFID transponders comprising:
- providing a roll or sheet of RFID transponders;
- providing a cartridge;
- providing an encoder;
- inserting the roll or sheet in the cartridge;
- coupling the cartridge to the encoder;

identifying information to encode; and
encoding the information on at least one RFID transponder.

36. The method of claim 35 further comprising:
detecting that the cartridge does not have at least one blank transponder;
alerting an operator of an empty cartridge condition; and
de-coupling the cartridge.

\* \* \* \* \*